United States Patent [19]
McIntyre

[11] 3,857,240
[45] Dec. 31, 1974

[54] PRIME MOVERS

[76] Inventor: Thomas McIntyre, Barrack St., Perth 6000, Australia

[22] Filed: Feb. 28, 1972

[21] Appl. No.: 229,643

[52] U.S. Cl.............. 60/221, 60/39.76, 60/39.77, 60/39.79, 60/39.8, 60/222, 60/230, 115/12 R, 115/14

[51] Int. Cl............................................. B63h 11/02

[58] Field of Search .... 60/221, 39.76, 39.77, 39.79, 60/39.8, 222, 228, 230; 115/12 R, 12 A, 14

[56] References Cited
UNITED STATES PATENTS

| | | | |
|---|---|---|---|
| 864,821 | 9/1907 | Zoelly | 60/39.76 X |
| 1,117,351 | 11/1914 | Edlin | 60/221 |
| 3,055,175 | 9/1962 | Clark | 60/221 |
| 3,285,214 | 11/1966 | Patton | 60/221 |
| 3,304,720 | 2/1967 | Craig | 60/39.76 X |
| 3,407,594 | 10/1968 | McComb | 60/39.77 X |
| 3,600,116 | 8/1971 | Clark | 60/39.76 |
| 3,643,438 | 2/1972 | Barsby | 60/221 |

FOREIGN PATENTS OR APPLICATIONS 1,232,171  5/1971  Great Britain.................... 60/39.76

*Primary Examiner*—Clarence R. Gordon
*Attorney, Agent, or Firm*—Wolfgang G. Fasse

[57] ABSTRACT

The disclosure is of certain possible modifications of the prime mover described in the Specification of United Kingdom Patent No. 1,232,171, which is a particular form of prime mover of the kind in which the power output is a function of the thrust produced in a body of liquid flowing along and completely filling a pipeline communicating at the inlet end thereof with a liquid source external to it by injections into the pipeline in the direction of flow of the liquid therealong of gas under pressure produced in a gas-generating unit communicating at its gas outlet with a duct leading to jet means discharging into the pipeline.

16 Claims, 57 Drawing Figures

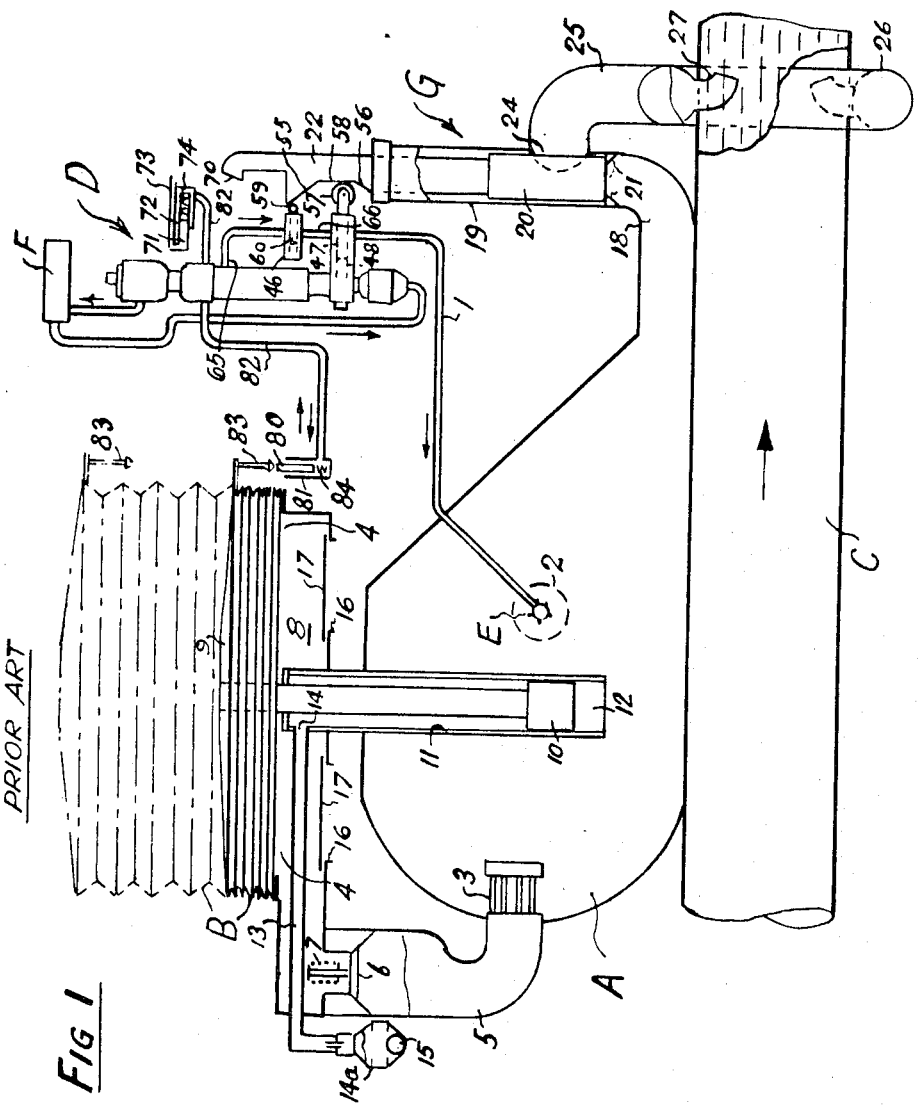
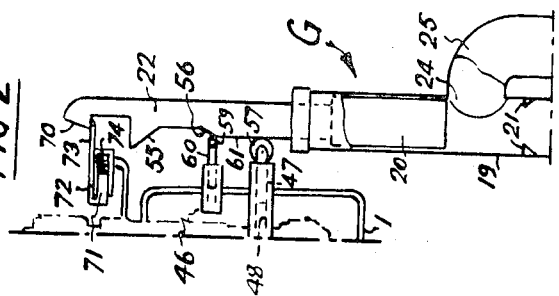
FIG 1 PRIOR ART
FIG 2 PRIOR ART

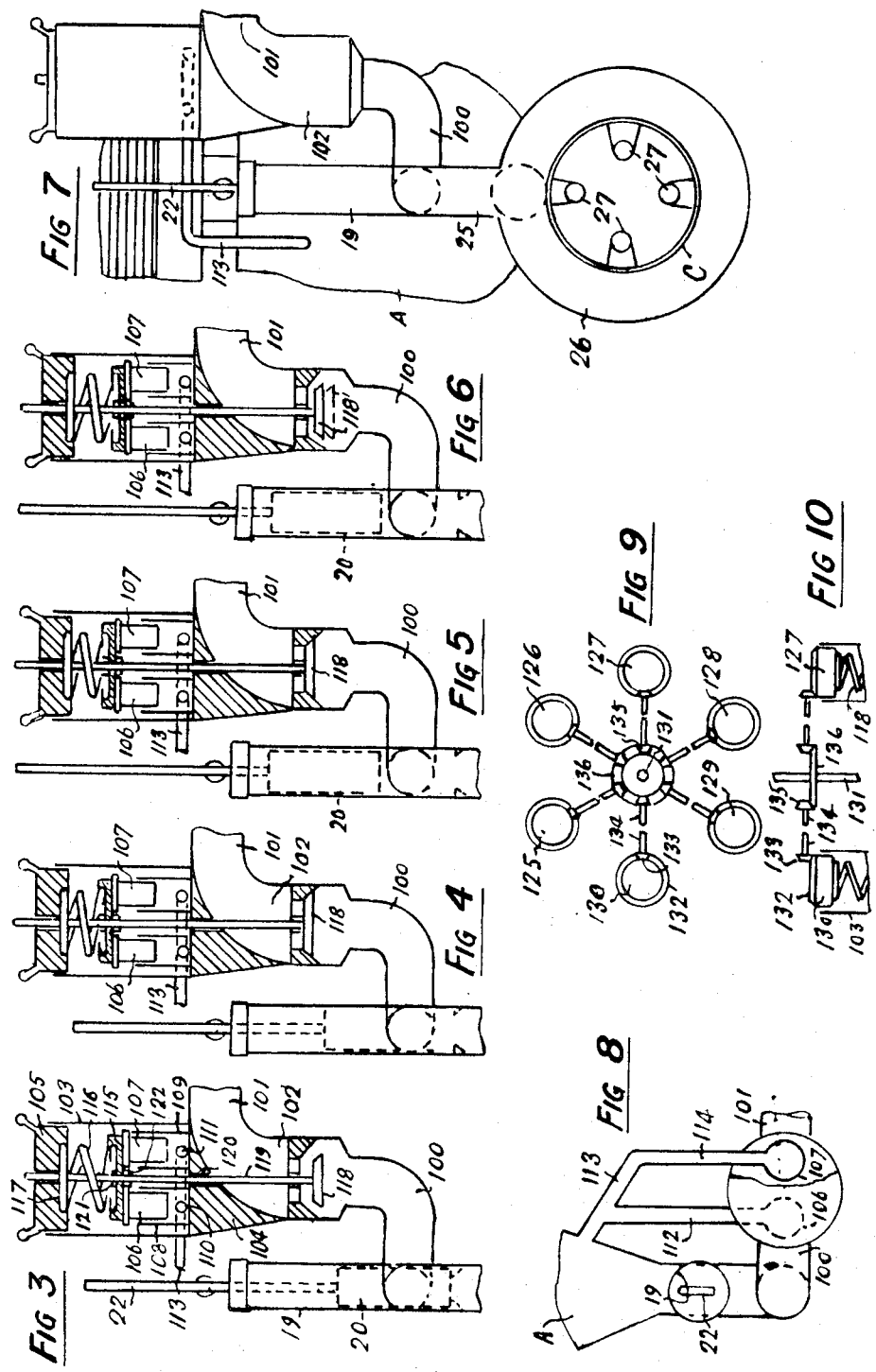

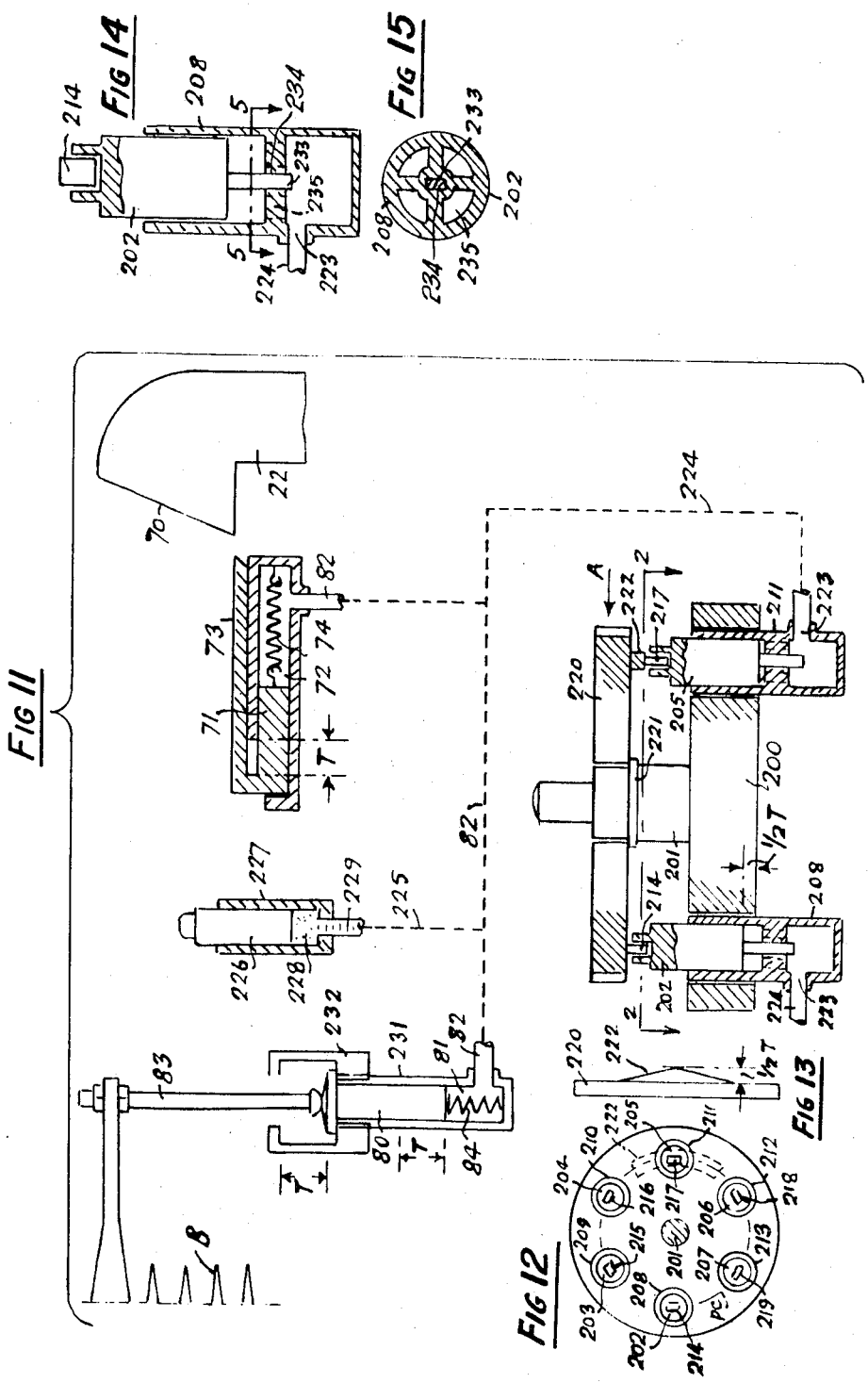

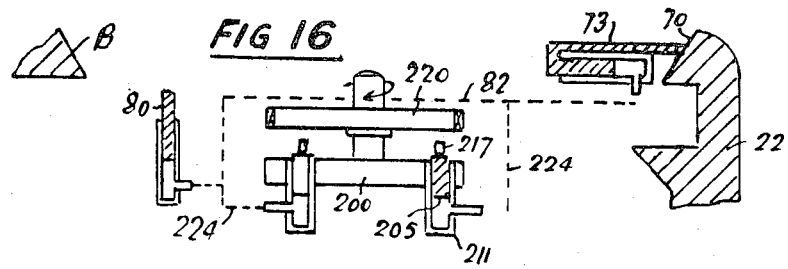
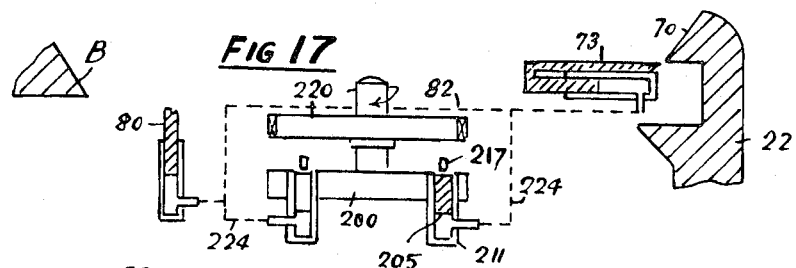
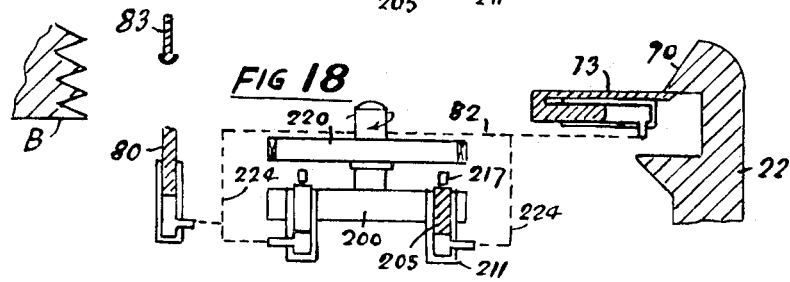
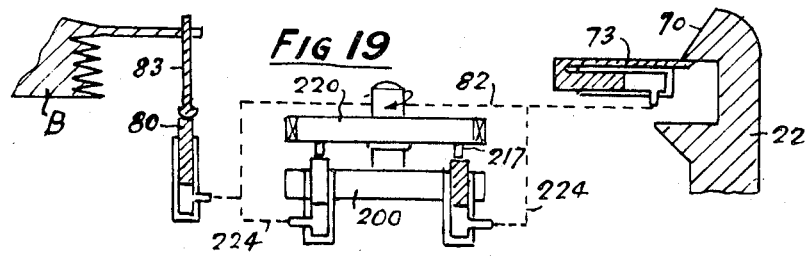
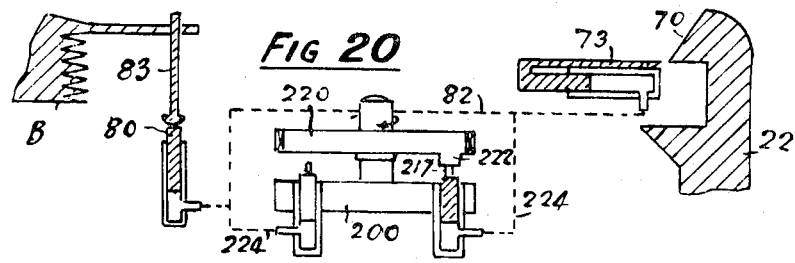

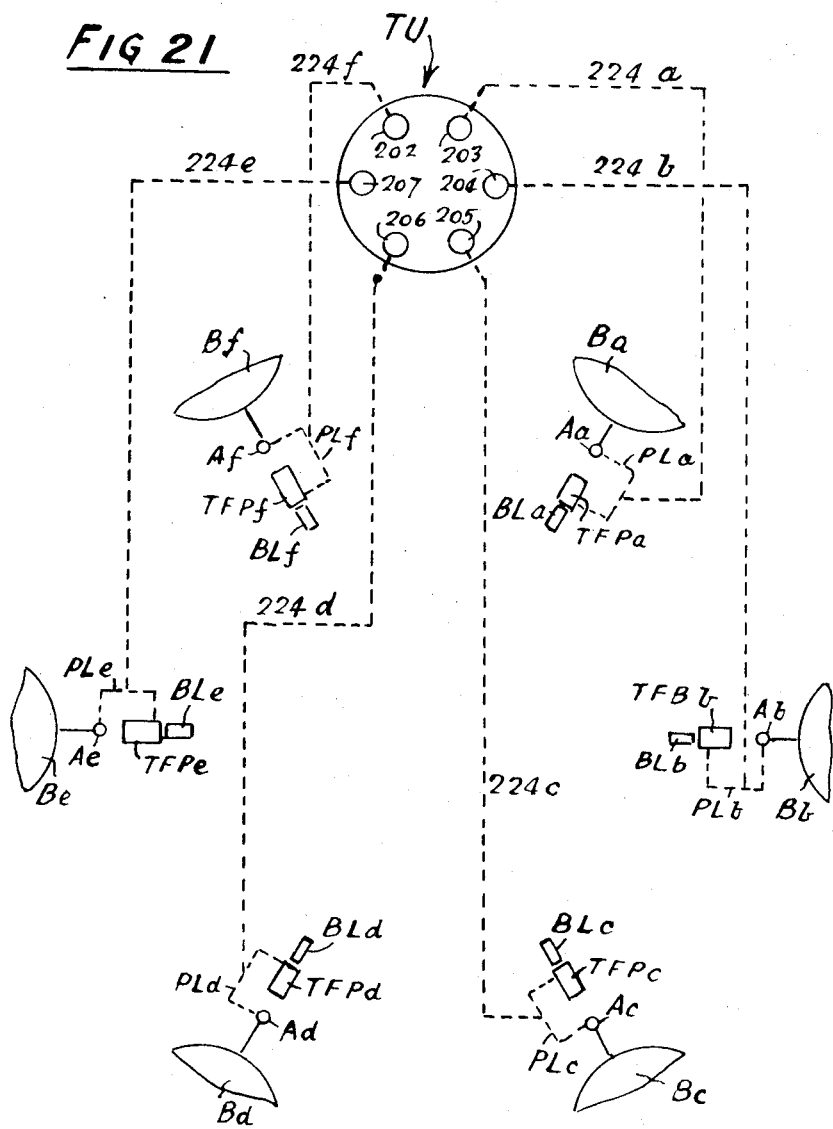

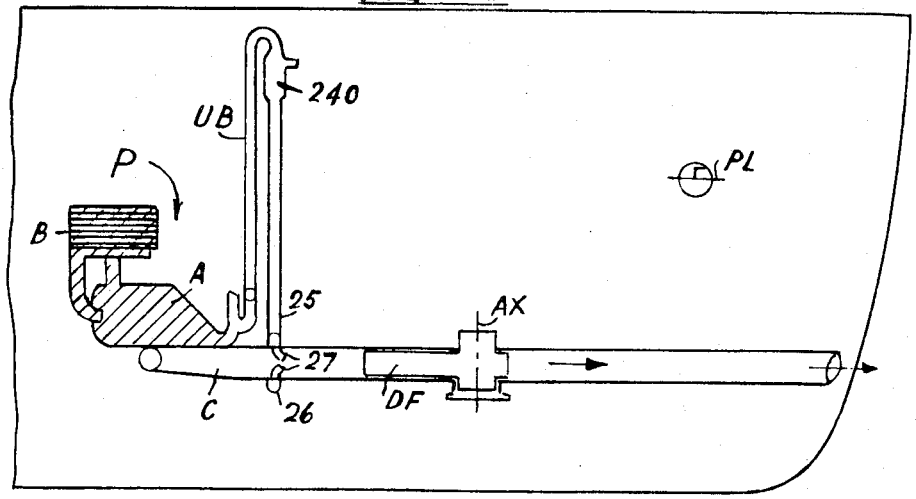
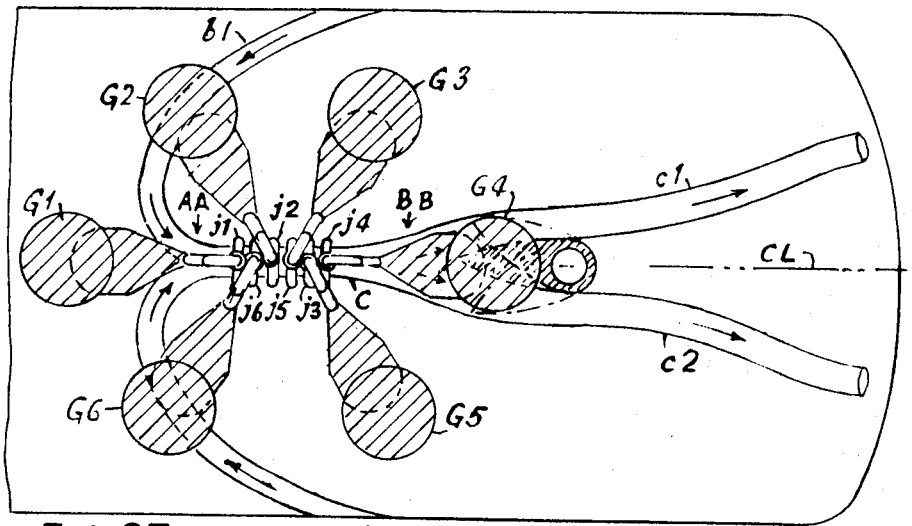
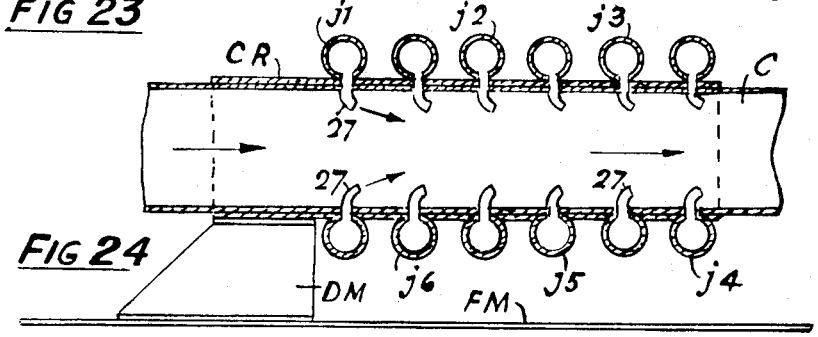

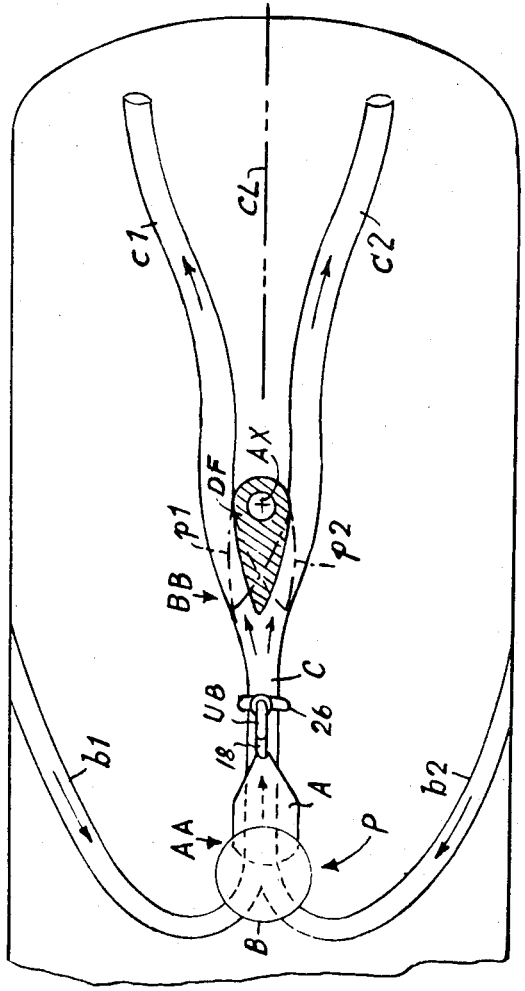

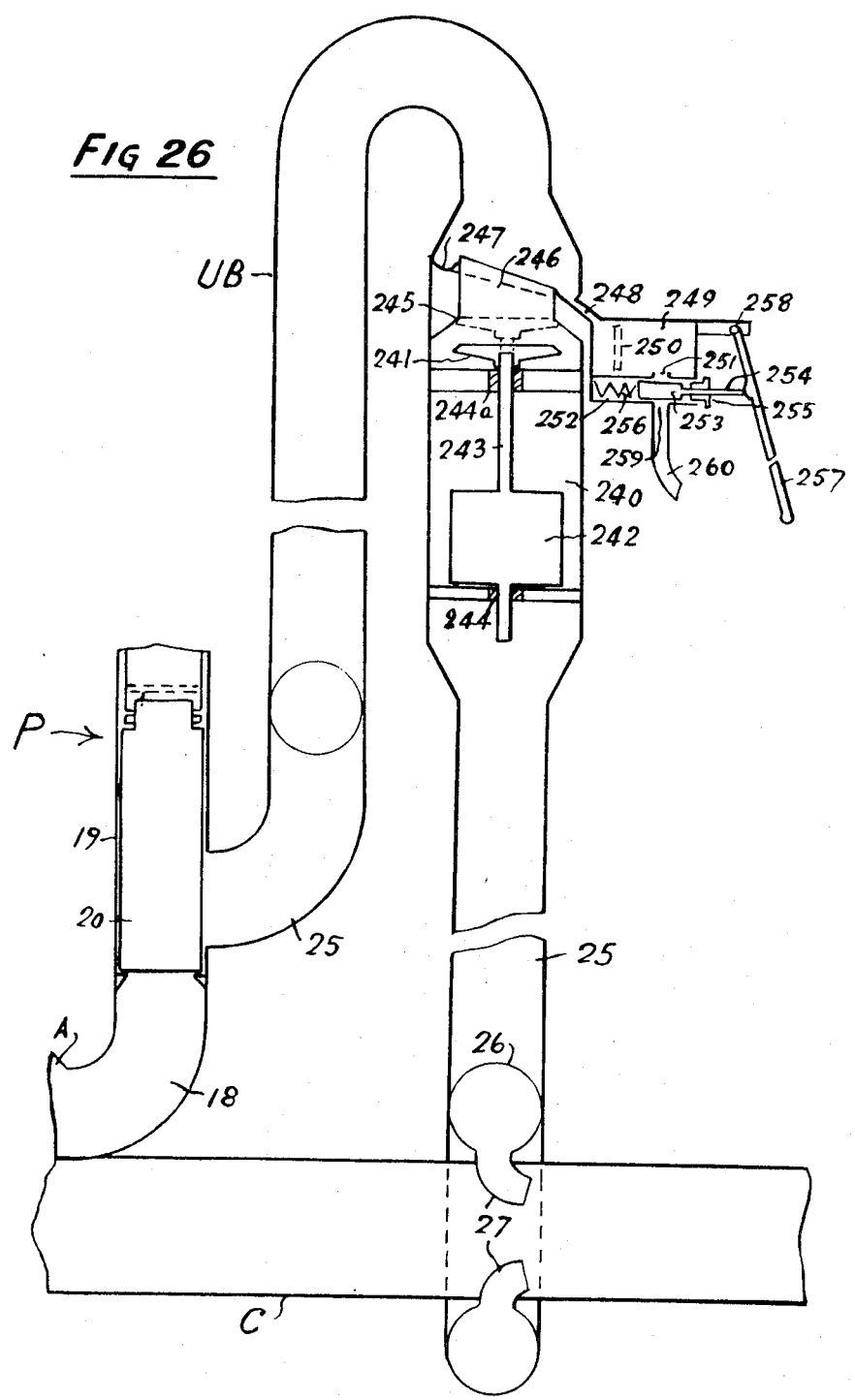

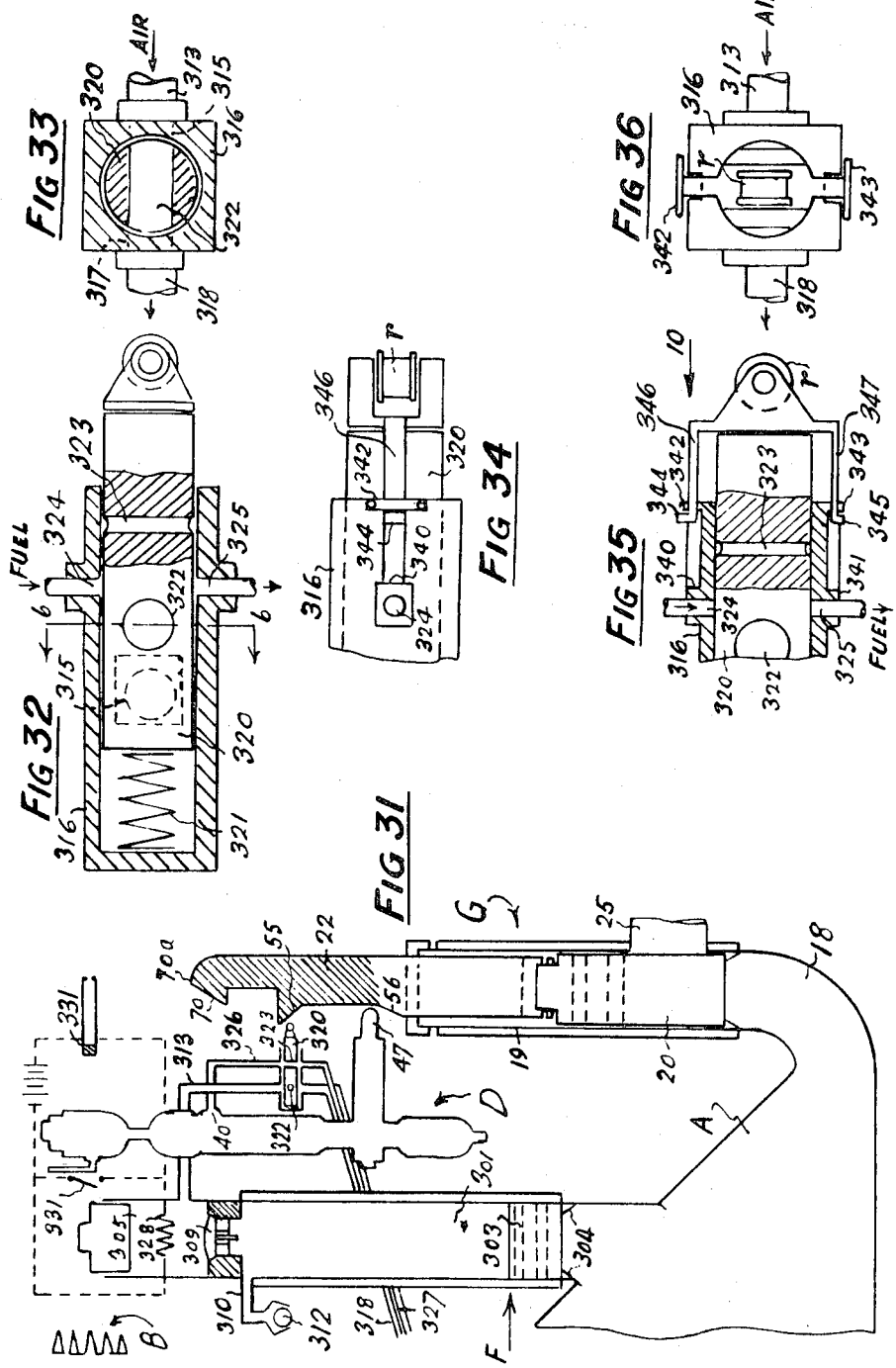

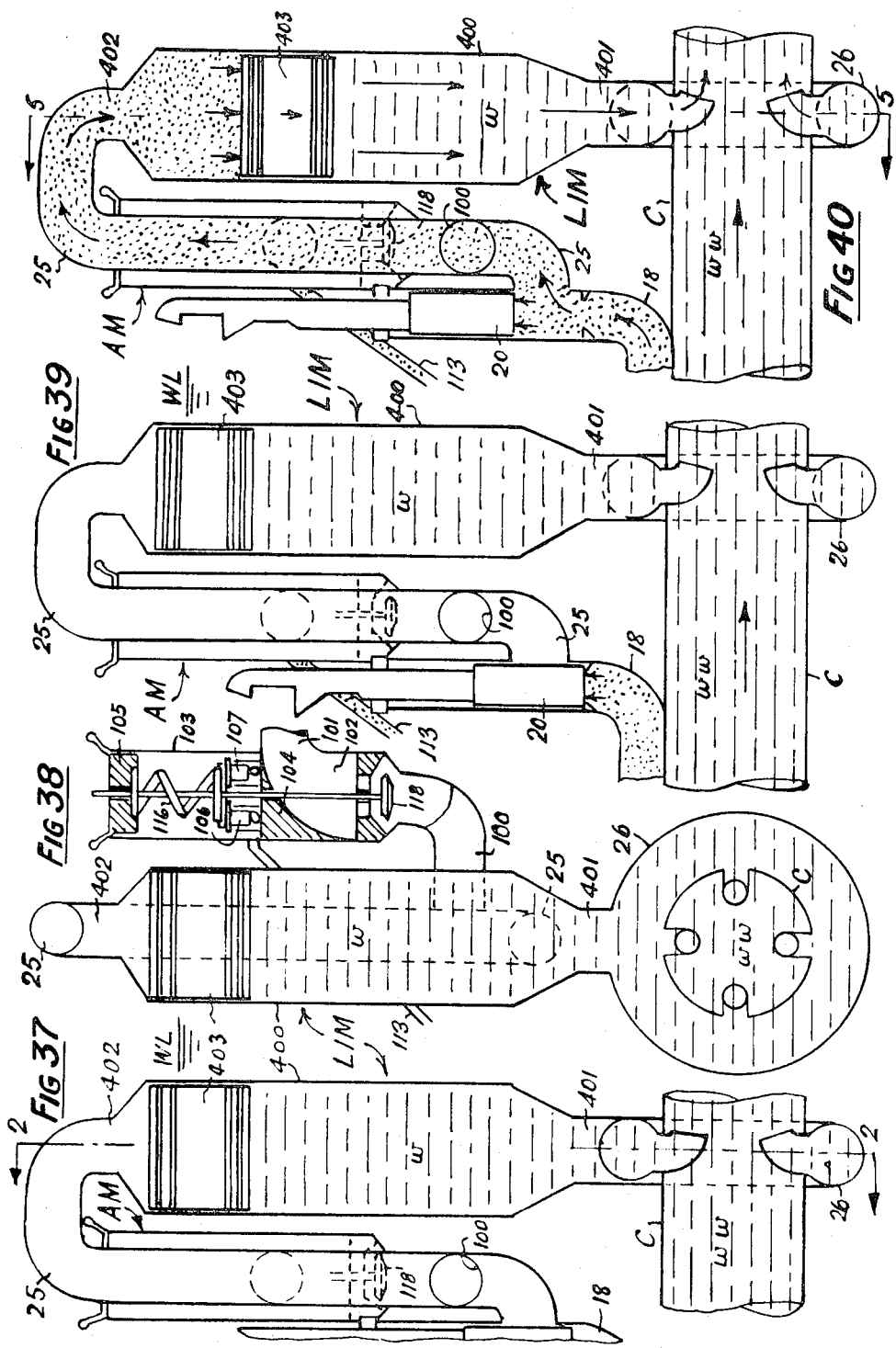

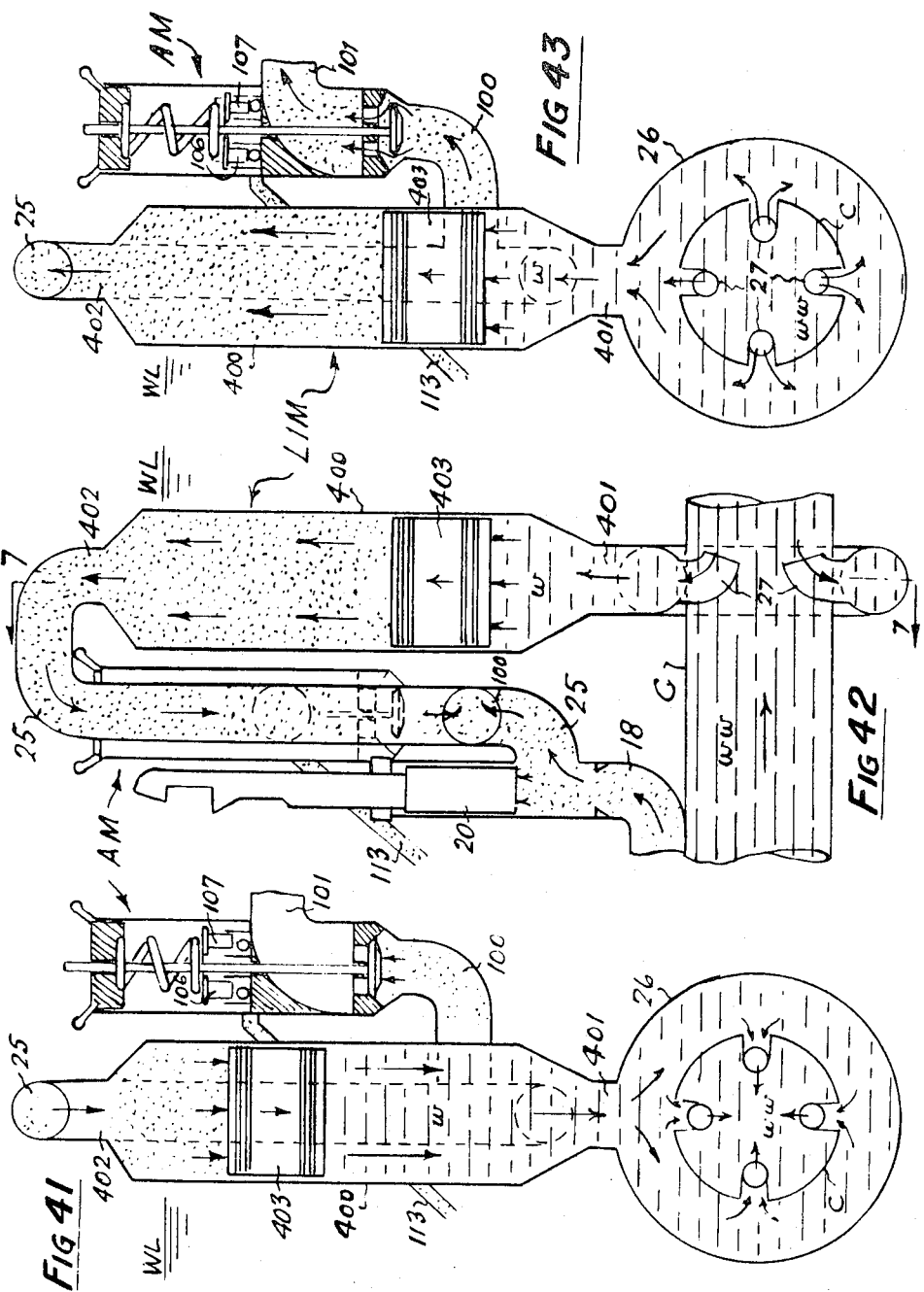

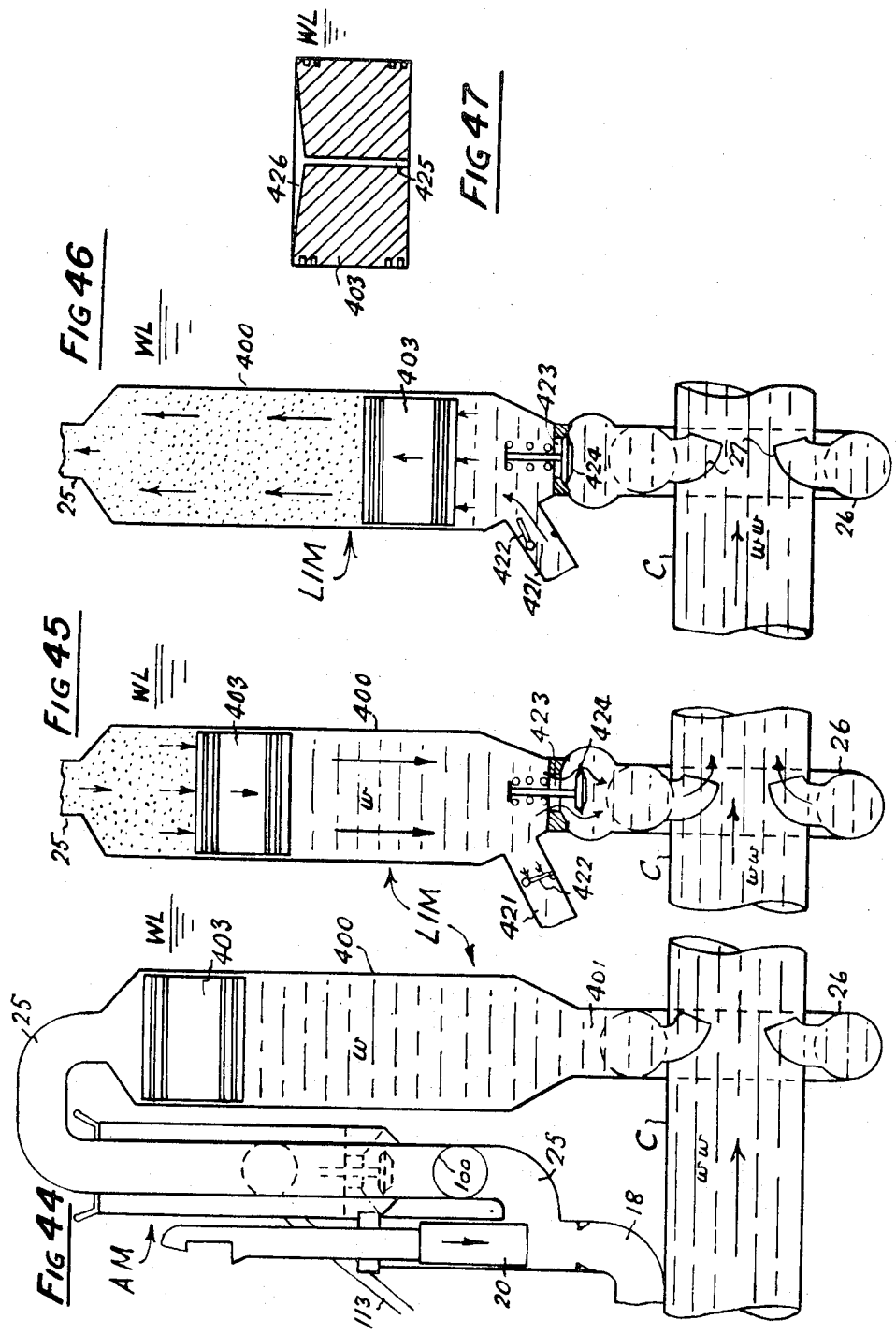

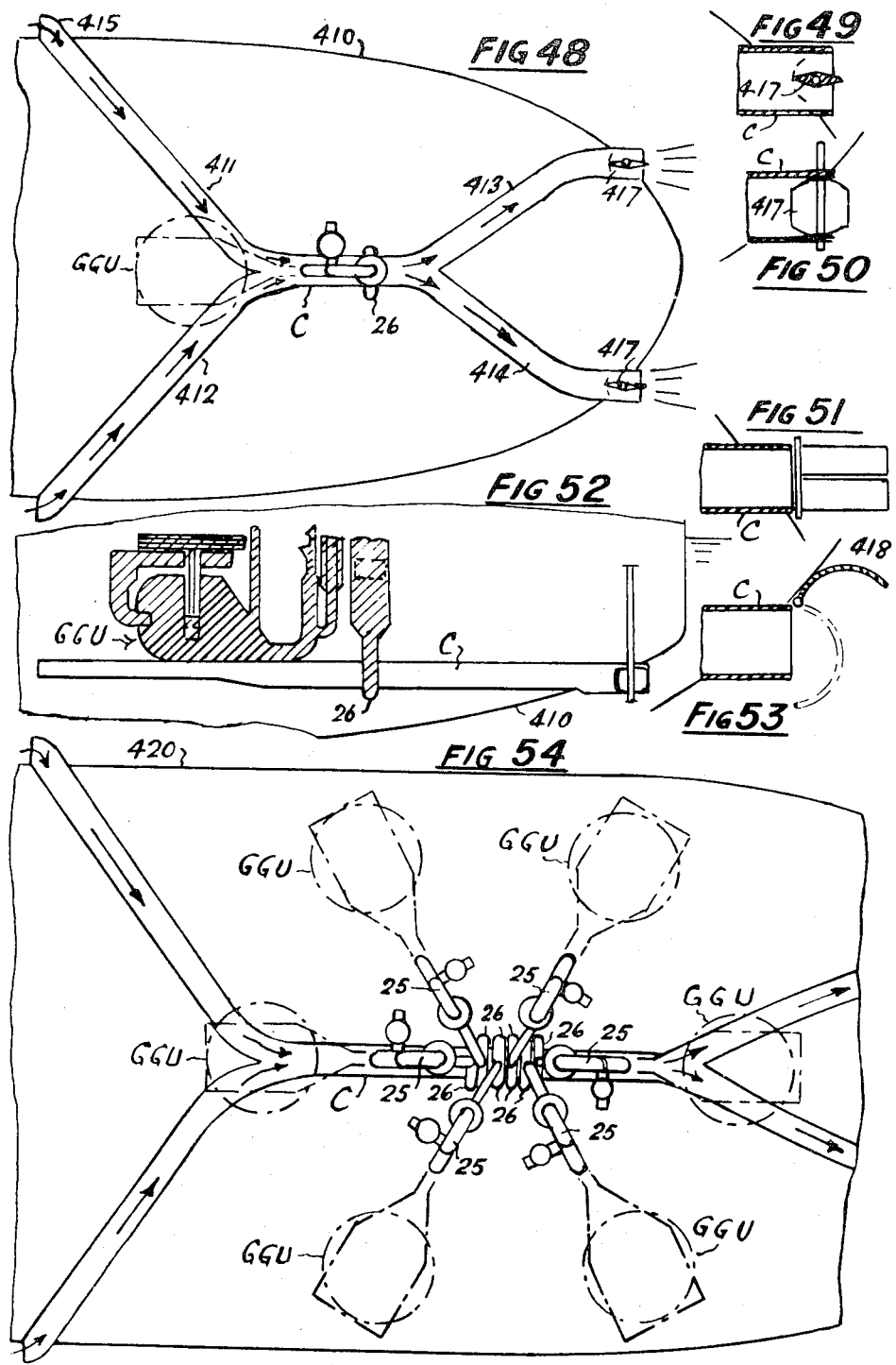

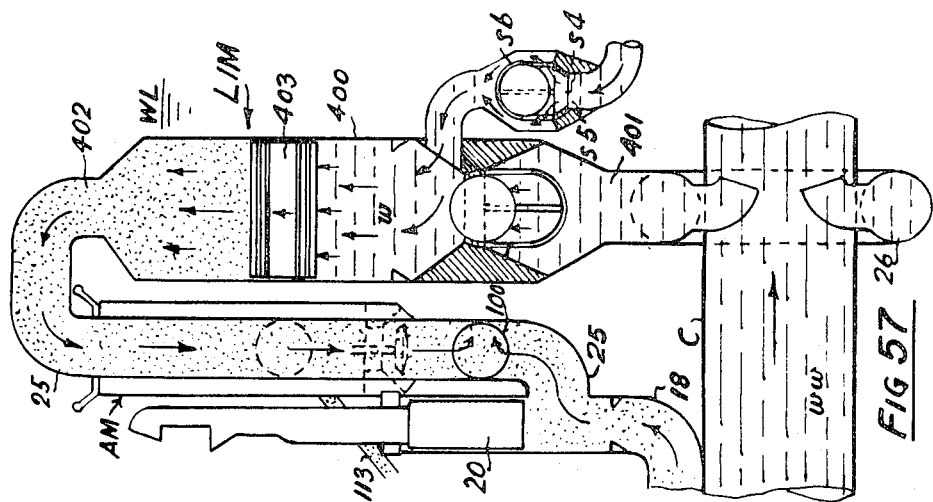
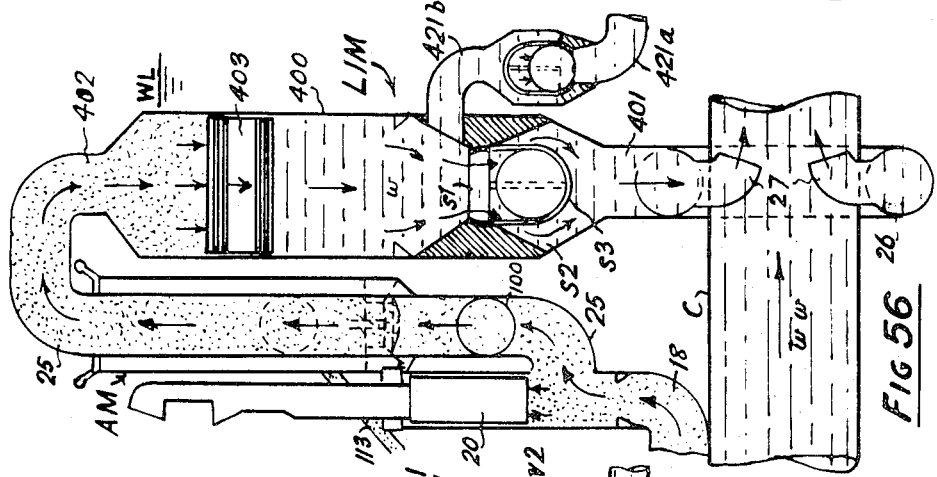
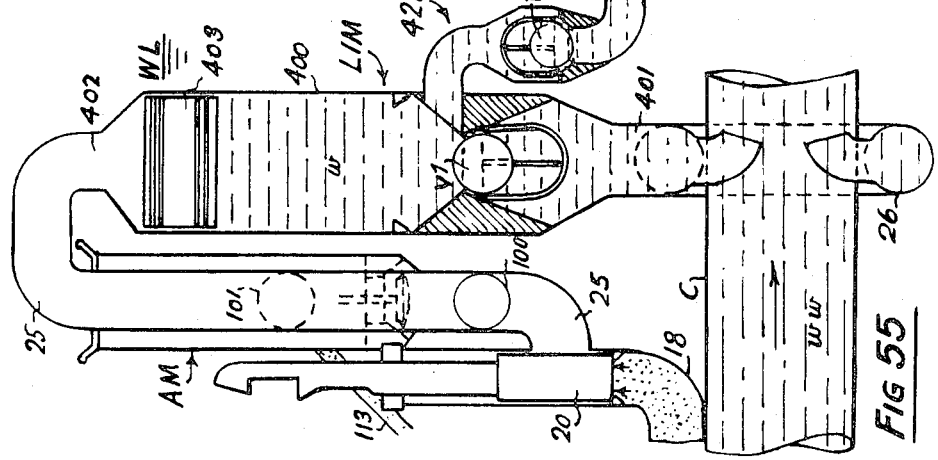

PRIME MOVERS

This invention relates to prime movers, more particularly for the propulsion of watercraft, and consists in certain modifications of the prime mover forming the subject matter of United Kingdom Pat. No. 1,232,171. This prime mover will hereinafter be referred to as the "parent prime mover."

The parent prime mover is characterized by a design according to which the power output is a function of the thrust produced in a body of liquid flowing along and completely filling a pipeline communicating at the inlet end thereof with a liquid source external to it by injection into the pipeline in the direction of flow of the liquid therealong of gas under pressure produced in a gas generating unit forming part of the prime mover, said gas generating unit communicating at its gas outlet with a duct (hereinafter called the "gas duct") leading to jet means discharging into the pipeline.

FIGS. 1 to 14 of the drawings of the aforesaid Pat. No. 1,232,171 illustrate one possible form of the parent prime mover and it is to this form (hereinafter called the "basic form") that the modifications of the present invention relate.

The basic form will now be described with reference to FIGS. 1 and 2 of the accompanying drawings. These Figures are reproductions (with certain details omitted) of FIGS. 1 and 2 of the drawings of the patent No. 1,232,171 and in describing them, and similarly in describing the remaining Figures of the drawings accompanying the present specification, the same reference letters and numerals will be used as are used in the drawings of the Pat. No. 1,232,171.

BASIC FORM

The prime mover comprises, as more fully disclosed in the specification and drawings of United Kingdom Pat. No. 1,232,171, the following components, viz. (1) A combustion chamber A; (2) An air storage chamber B constituted by a bellows; (3) A conduit C forming the pipeline of the prime mover; (4) A fuel feed unit D; (5) A fuel injection nozzle E located within chamber A; (6) A fuel tank F in automatic fuel circulatory relation to unit D; and (7) Mechanism G, hereinafter called the "fuel feed control mechanism," for actuating unit D.

Liquid fuel is injected into combustion chamber A from unit D by way of a pipeline 1 leading to nozzle E. Nozzle E is located within an incandescible cage 2 adapted to promote immediate combustion of the injected fuel on admission into chamber A.

Air for combustion is forced into chamber A from bellows B by way of an air inlet 3 located within chamber A, the air being so forced during collapse of the bellows. Collapse of the bellows is produced by gravitational forces acting upon the crown and other movable parts of the bellows against the gas pressure obtaining in chamber A, which gas pressure at the close of collapse of the bellows is substantially at or a little below atmospheric pressure. The air from bellows B flows to air inlet 3 by way of a first air duct 4 and a second air duct 5, flow from duct 4 to duct 5 being subject to automatic control by a non-return valve 6 opening inwardly of duct 5 and spring loaded as by a loading spring 7 to such an extent that the valve will open when only a very small pressure differential exists on the two sides of the valve. Air flows from bellows B into air duct 4 by way of a bellows air chamber 8 sealed to, and forming a downward extension of the bellows.

Bellows B inflates and deflates once per working cycle of the gas generating unit. Inflation of the bellows is produced by upward thrust exerted upon the rigid crown 9 of the bellows by a piston 10 working in a bore 11 open at the lower end 12 thereof to the interior space of chamber A. Bore 11 communicates, at the upper end thereof, with an air duct 13 by way of an orifice 14 which is continually open. Air duct 13 leads from an external air inlet 14a automatically controlled by a non-return valve 15 opening inwardly of the inlet. Only a slight pressure differential on the two sides of the valve is required to produce opening of the valve. Valve 15 opens in consequence of downward movement of piston 10, i.e., as bellows B collapses, and closes in consequence of upward movement of piston 10, i.e., as bellows B inflates. Air flows into bellows B from the external atmosphere by way of chamber 8, the air entering chamber 4 by way of an air inlet 16 in the floor of the chamber which is opened and closed automatically by a non-return flap valve 17 opening inwardly of the chamber under the influence of a small pressure differential between the external atmosphere and the interior space of the chamber.

Combustion chamber A has an upwardly turned gas outlet 18 communicating with a cylinder 19 in the bore of which a piston 20 reciprocates once per working cycle of the gas generating unit. Piston 20 is forced upwardly by combustion gases produced in chamber A, and it descends under the pull of gravitational forces acting upon it as the pressure of said combustion gases decreases in the course of the working cycle of the gas generating unit. Piston 20 so reciprocates between a lower position (FIG. 1) in which it is seated on an annular seating 21 and an upper position (FIG. 2) in which it is positioned near the upper end of the bore of cylinder 19. Piston 20 carries in fast relation to it an upwardly projecting blade 22 (hereinafter called the "cam blade") extending through an elongated slot in the crown of cylinder 19. When piston 20 is in the lower (FIG. 1) position it seals gas outlet 18 and when it is in the upper (FIG. 2) position it opens an orifice 24 in the wall of cylinder 19.

Orifice 24 places the interior space of cylinder 19 in communication with a conduit 25 constituting the "gas duct" of the prime mover. Conduit 25 opens into an annular nozzle ring 26 from which radiate inwardly of the ring a series of injection nozzles 27 opening into the bore of a conduit C forming the "pipe line" of the prime mover. Nozzles 27 are directed substantially axially of conduit C in the direction of flow of the liquid therealong. When piston 20 is in the lower (bottom-of-stroke) position chamber A is sealed relative to the bore of conduit C and when piston 20 is in the upper (top-of-stroke) position chamber A is in open communication with said bore. Piston 20 forms, therefore, a shutter for the gas outlet of the combustion chamber.

The details and manner of operation of fuel feed unit D are fully set forth in the specification of Pat. No. 1,232,171.

Mechanism G includes the piston 20 and two cams 55, 56 on cam blade 22. When piston 20 is in its bottom of stroke (FIG. 1) position a cam follower roller 57 on a plunger 47 forming part of fuel feed unit D engages a first vertical land 58 on cam blade 22 situated immediately above cam 56 and a cam follower roller 59 on plunger 60 of a fuel control valve 46 also forming part of the unit D engages cam 55 at a position therealong near the top of the cam. As piston 20 rises roller 57 rides along cam 56 onto a second vertical land 61 situated below cam 56 and roller 59 rides along cam 55 onto land 58. As piston 20 rises, therefore, plunger 47 moves inwardly (i.e., to the left) along bore 48 and plunger 60 moves outwardly (i.e., to the right) along a bore in the casing of fuel control valve 46 — as more fully described, and with the consequences also fully described, in the specification of the Pat. No. 1,232,171.

Located at the top of cam blade 22 is a cam 70. This cam forms part of a detent means for automatically detaining piston 20 at the end of its upward working stroke pending completion of collapse of the bellows to the condition in which it appears in full lines in FIG. 1. The fully inflated condition of the bellows in shewn in chain line in FIG. 1.

Said detent means includes in association with cam 70 a plunger 71 working in a fixed bore 72, the plunger 71 carrying in fast relation to it a trip finger 73 the operative end of which is so positioned as to lie in the path of cam 70, said cam 70 being effective near the end of the upward working stroke of piston 20 to move trip finger 73 aside (to the left) with resulting movement of plunger 71 to the left against the opposing constraint of a tension spring 74 tending always to move the plunger in the reverse direction. The arrangement is such that when piston 20 has reached a position at the extreme end of its upward working stroke (FIG. 2) plunger 71 automatically returns under pull from spring 74 to a position in which the operative end of trip finger 73 engages under cam 70 so as to hold the piston in its raised position.

Also forming part of the detent means is a mechanism functioning to release the detent means. This mechanism includes a plunger 80 working in a fixed bore 81 connected to bore 72 by a pipeline 82 filled with hydraulic fluid. Plunger 80 is located in the path of an abutment 83 on the crown 9 of bellows B so as to be depressed thereby against the opposing constraint of a compression spring 84, with resulting movement of plunger 71 in the piston (20) releasing direction, i.e., to the position in which it appears in FIG. 1. Plunger 80 is held rigidly in the depressed position by the weight of the movable parts of the bellows until the next upward movement of crown 9 of the bellows. During an initial portion of said upward movement of crown 9 abutment 83 releases plunger 80 for return (upward) movement in bore 81 under thrust from spring 84, thereby allowing spring 74 to draw back (i.e., to the right) plunger 71 and therewith trip finger 73 to the piston-arresting positions of those parts in which they are seen in FIG. 2.

In the operation of the gas generating unit a powerful and rapid build-up of pressure occurs in chamber A. This high-pressure phase continues only momentarily so that it almost immediately occasions the commencement of upward movement of piston 20 and simultaneously the commencement of upward movement of piston 10 with resulting inspiration of air from the external atmosphere into chamber 8 by way of inlet ports 16 (flap valve 17 being in the open position) and thence into bellows B. This constitutes a first phase of the working cycle of the gas generating unit.

Then follows a second phase of said cycle. In this phase piston 20 has partly opened gas outlet 18 of the combustion chamber, so releasing the combustion gases therein for flow under pressure to jet ring 26 and thence into the liquid flowing along duct C, via jet nozzles 27 — so generating a powerful thrust pulse in the liquid. Bellows B is fully inflated in this phase (FIG. 1), with the result that inspiration of air into the bellows has ceased, valve 17 is in its closed condition and valve 6 is still closed.

The second phase continues until a third phase piston 20 has reached the end of its upward working stroke and has become locked in this position through the agency of the detent means (trip finger 73 etc.). In this phase valves 6 and 17 are still closed and products of combustion are still being forced out of the combustion chamber into the pipeline.

This continues until at the commencement of a fourth phase of the cycle residual gases in the combustion chamber begin to be swept out of the combustion chamber by air flowing into the combustion chamber from bellows B via chamber 8, duct 4, duct 5 and air inlet 3, the pressure of the air flow opening valve 6 and keeping it open until bellows B is in its fully collapsed condition. Valve 17 is closed and maintained closed throughout this fourth phase by air pressure in chamber 8. Gas generation in combustion chamber A has now ceased and the chamber has been scavenged by a copious inflow of air from bellows B. Piston 20 has also been released by the detent means, trip finger 73 having been momentarily withdrawn from effective position under cam 70 on cam blade 22 by depression of plunger 80 by pressure from abutment 83 on crown 9 of bellows B during the closing phase of collapse of the bellows, as already described.

In a fifth phase of the cycle piston 20 descends, having been released by the detent means. As it descends it progressively covers orifice 24, eventually completely closing the orifice so as to cut off chamber A from nozzles 27. The descent of the piston continues until the piston reaches its bottom-of-stroke (FIG. 2) position on seating 21.

Conditions are now a repetition of those in the first phase of the working cycle of the gas generating unit. The working cycle therefore repeats.

As will be seen, chamber A is large, because combustion takes place with the air in the chamber at or near atmospheric pressure, and the cycle of operation of the gas generating unit is slow — e.g. only a few cycles per minute. The slowest phase of the cycle will be the scavenging phase, when plus pressure in the combustion chamber is approaching zero.

It may be stated, therefore, that the modifications aforesaid relate to a prime mover comprising the following elements:

A. A gas generating unit operating intermittently on a repetition cycle and comprising (1) a combustion chamber having a gas outlet for the escape of combustion gases produced in the chamber at each working cycle of the unit; (2) an automatic mechanism for pumping a measured quantity of air into the combustion chamber once per working cycle of the unit; (3) an automatic mechanism for pumping a measured quantity of liquid fuel into the combustion chamber once per working cycle of the unit; (4) an automatic shutter mechanism for momentarily closing said gas outlet at the end of each working cycle of the unit to ensure a rapid build-up of pressure in the chamber to a high magnitude at the commencement of the next following cycle; and (5) mechanism interlinking mechanisms 2, 3 and 4 in such manner that they all come into operation in the required sequence, said sequence being such that mechanism 2 comes into operation shortly before closure of the gas outlet and mechanism 3 comes into operation immediately following closure of the gas outlet, said measured quantity of air being a quantity sufficient first to scavenge the combustion chamber and then to refill the chamber with a fresh charge of air for combustion in said next following working cycle;

B. A pipeline along which, throughout the operation of the prime mover, a body of liquid completely filling the pipeline is maintained in uni-directional relative flow movement with respect thereto by successive injections into it by way of jet means discharging into the pipeline of combustion gases produced in the combustion chamber, there being one such injection in every working cycle of the gas generating unit, the gases being conveyed to said jet means via a gas conduit leading thereto from the gas outlet of the combustion chamber.

Such a prime mover will be designated in the further description of the invention and also in the appended claims a "prime mover of the construction specified."

As described in the specification of United Kingdom Pat. No. 1,232,171 the prime mover forming the subject matter of that patent may take either of two forms, (1) a form wherein a single gas generating unit is used, (2) a form wherein two or more identical gas generating units are used operating in succession in conjunction with a single pipeline common to them all. Form 1 will be designated a "single-unit prime mover." Form 2 will be designated, a "multi-unit prime mover."

The modifications are five in number and will be designated "Modification A," "Modification B," "Modification C," "Modification D" and "Modification E" respectively. They will now be described.

MODIFICATION A

According to this modification a prime mover of the construction specified includes means (hereinafter referred to as the "accelerator mechanism") for venting the combustion chamber of the gas generating unit once per working cycle of the unit whenever during the chamber scavenging phase of the cycle the gas pressure in the chamber falls to a value below a predetermined value, said venting means being automatic and responsive to gas pressure changes in the combustion chamber.

In virtue of this modification two important effects are achieveable. These are:

1. Ensurement of complete scavenging — which is necessary for efficient and uniform working of the prime mover.

2. Adjustment as may be required of the operational speed of the prime mover for a given rate of supply of fuel and air to the combustion chamber — this second effect being readily achievable with an arrangement as hereinafter more particularly described in which the venting means includes a vent passage leading to atmosphere and a gas escape valve in controlling relation to said vent passage, said valve being spring loaded in the direction to open the passage and pneumatically loaded in the opposite direction by pressure-responsive means continuously loaded by the gas pressure obtained in the combustion chamber.

For example, as to effect 1, if the prime mover is used for the propulsion of a watercraft, there will be a tendency for the water pressure outside the craft to counterbalance the pressure of the gas in the combustion chamber when that pressure has fallen to a low value — with consequent prevention of complete scavenging of the chamber. Modification A completely and in a very simple manner overcomes this difficulty.

As to effect 2, this effect is readily achievable by reason of the fact that, within limits, the operational speed of a prime mover of the construction specified, for a given rate of supply of fuel and air to the combustion chamber of the gas generating unit, varies with the duration of the scavenging phase of the working cycle of the unit, reckoned as a ratio of the overall duration of one complete cycle. Therefore, by adjusting the setting of the loading spring of the gas escape valve — thereby increasing or reducing the magnitude of the gas pressure in the combustion chamber at which the valve is designed to open to permit escape of gas from the chamber to the atmosphere — the duration of the scavenging phase, and therefore the overall duration of a complete working cycle of the unit, is correspondingly increasable or decreasable — according to the sense in which the setting of the loading spring of the valve is adjusted.

MODIFICATION B

This modification concerns a multi-unit prime mover of the construction specified in which in the case of each gas generating unit mechanism 5 of the unit includes cam means on a cam carrier fast with the shutter of mechanism 4, said cam carrier being reciprocatable between a first position in which the shutter is in the closed position thereof and a second position in which the shutter is in the open position; detent means for holding the cam carrier in the first position until such time as in the working cycle of the unit the gas outlet of the combustion chamber is due to close, and an hydraulic linkage between the detent means and mechanism 2, such that the detent means is automatically operated to the ineffective condition under the control of mechanism 2, said control being exercised through the hydraulic linkage.

According to the modification a multi-unit prime mover of this description is characterised by an arrangement according to which, in the case of each gas generating unit, a pipe filled with hydraulic fluid and constituting part of the hydraulic linkage component of mechanism 5 of the gas generating unit includes a branch stemming therefrom and terminated by a piston working in a cylinder forming with the piston part of a timing unit for the gas generating units, said timing unit being operative to bring the hydraulic linkages of the respective gas generating units into function in predetermined sequence and at predetermined time intervals, the arrangement being one in which in the case of each gas generating unit a reciprocatable member forming part of mechanism 2 functions during the pumping phase of that mechanism to force the branch piston to a position in its cylinder in which it lies in the path of a cam on a power driven cam carrier also forming part of the timing unit, said cam carrier being driven at a predetermined speed and its location being such that as it performs its operational movement it brings the cam into register with the branch pistons in predetermined sequence, forcing them back in said sequence to initial position in the relative cylinder against the resistance of said reciprocatable member and producing in consequence the required operation of the detent means of mechanism 5 in the direction to release the shutter for return to its closed position.

With such an arrangement the two factors 1 and 2 set out below are both subject to control in an arbitrary manner:

1. The sequence of operation of the two or more gas generating units.
2. The time interval between successive operations of each unit.

In virtue of such arbitrary control of factor 2 it is possible, with the use of a construction in which the cam carrier is movable at a speed which is variable at will, to adjust as required the rate at which gas, in the aggregate of two or more units, is discharged into the pipeline and therefore, in the case of a prime mover used for the propulsion of a watercraft, the speed of the craft.

MODIFICATION C

This modification applies in a case where the prime mover is used for the propulsion of a watercraft and it has for its object to provide means in such a prime mover for preventing water from the pipeline reaching the combustion chamber of the gas generating unit — which may be likely to occur if the gas generating unit is located at a level in the craft close to the waterline.

The modification consists in interposing in the gas duct of the prime mover a water trap — one convenient arrangement being later described herein.

MODIFICATION D

This modification has for its object to solve the problem of ensuring immediate ignition and rapid combustion of the fuel-air mixture on admission to the combustion chamber — again, one convenient arrangement being later described herein.

MODIFICATION E

It may be found, in the operation of a prime mover of the construction specified, that a certain proportion of the energy which in each working cycle of the gas generating unit is given up by the liquid fuel in the combustion chamber, in the form of heat, will be absorbed by the liquid in the pipeline, again in the form of heat — thereby resulting in a loss of energy which would otherwise be available in the gases for power production. It may also be found that a further amount of otherwise available energy in the combustion gases will be lost through friction effects in the pipeline due to turbulence in the liquid produced by the injection high pressure gases into the liquid.

According to modification E such possible energy losses are avoided in a simple and efficient manner by using an arrangement in which the liquid in the pipeline is maintained in uni-directional relative flow movement with respect thereto by successive injections into it, by way of jet means discharging into the pipeline, of a liquid medium, said liquid medium being injected into the pipeline, via said jet means, by pump means operated by combustion gases from the gas generating unit, there being one such injection in every working cycle of the gas generating unit and the gases being conveyed to said pump means by way of a gas conduit leading thereto from the gas outlet of the combustion chamber of the gas generating unit — element A of the prime mover remaining the same, i.e., as recited above in the definition of what is meant by a "prime mover of the construction specified."

Further according to this modification the prime mover may embody the constructional features of modification A — as in the particular embodiment of the invention vide modification A later described.

BRIEF FIGURE DESCRIPTION

FIG. 1 is an elevational view of the prime mover of my British Pat. No. 1,232,171;

FIG. 2 is a view of a portion of the prime mover of FIG. 1, with the cam held in its upper position;

FIGS. 3 to 6 are fragmentary elevational views of the parts of the prime mover according to modification A of this invention, whereby these figures illustrate various phases in the operation of the mechanism;

FIG. 7 is a view similar to that of FIG. 3 drawn on a smaller scale and showing certain additional parts not shown in FIGS. 3 to 6 and 8;

FIG. 8 is a fragmentary plan view of the arrangements of FIGS. 3 to 6;

FIGS. 9 and 10 are respectively a plan view and a side view illustrating an arrangement in which a group of six identical gas generating units are collectively and simultaneously controlled by a central control unit for the six escape valves, in accordance with modification A;

FIG. 11 is an elevational view showing the essential parts of the timing unit of modification B;

FIG. 12 is a section through FIG. 11 on line 2—2;

FIG. 13 is an elevational view of one of the parts of the arrangement of FIG. 11, this view looking in the direction of arrow A in FIG. 11;

FIG. 14 is a vertical section through another portion of the arrangement of FIG. 11;

FIG. 15 is a section through FIG. 14 on line 5—5;

FIGS. 16 to 20 illustrate successive phases hereinafter designated phases a, b, c, d and e in the operation of the timing unit of modification B;

FIG. 21 is a diagrammatic layout of the various pipe connections of the timing unit of modification B;

FIG. 22 is an elevational view of the stern end of a watercraft fitted with a prime mover in accordance with modification C of the invention, constituting the propulsion unit of the craft;

FIG. 23 is a view similar to that of FIG. 25, illustrating the case in which the propulsion plant comprises a plurality of identical gas generating units operating in conjunction with a common pipeline, the plant being therefore a multi-unit prime mover;

FIG. 24 is an elevational view of a portion of the pipeline of the propulsion plant of the craft of FIG. 23;

FIG. 25 is a plan view of FIG. 22;

FIG. 26 is an elevational view of a portion of the propulsion plant of the craft;

FIGS. 28 to 31 are similar views showing the positions occupied by the movable parts of the unit as shown in FIG. 27 in four successive phases of the operation of the gas generating unit;

FIG. 32 is an axial section through a valve (hereinafter called the "fuel-hot air injection valve") which releases preheated compressed air from a preheating chamber and delivers it in intimate admixture with liquid fuel into the combustion chamber of the gas generating unit via a nozzle (hereinafter called the "fuel-hot air injection nozzle);"

FIG. 33 is a cross section through FIG. 32 on line 6—6;

FIG. 34 is a fragmentary end plan view of the fuel-hot air injection valve as viewed towards the cam blade of the fuel feed control mechanism of the gas generating unit;

FIG. 35 is a fragmentary elevational end view of the fuel-hot air injection valve;

FIG. 36 is an end view of the same valve looking in the direction of arrow 10 of FIG. 35;

FIG. 37 is a fragmentary elevational view of the prime mover according to modification E showing (a) the pump means LIM aforesaid and (b) the accelerator mechanism AM of modification A;

Figure 27:
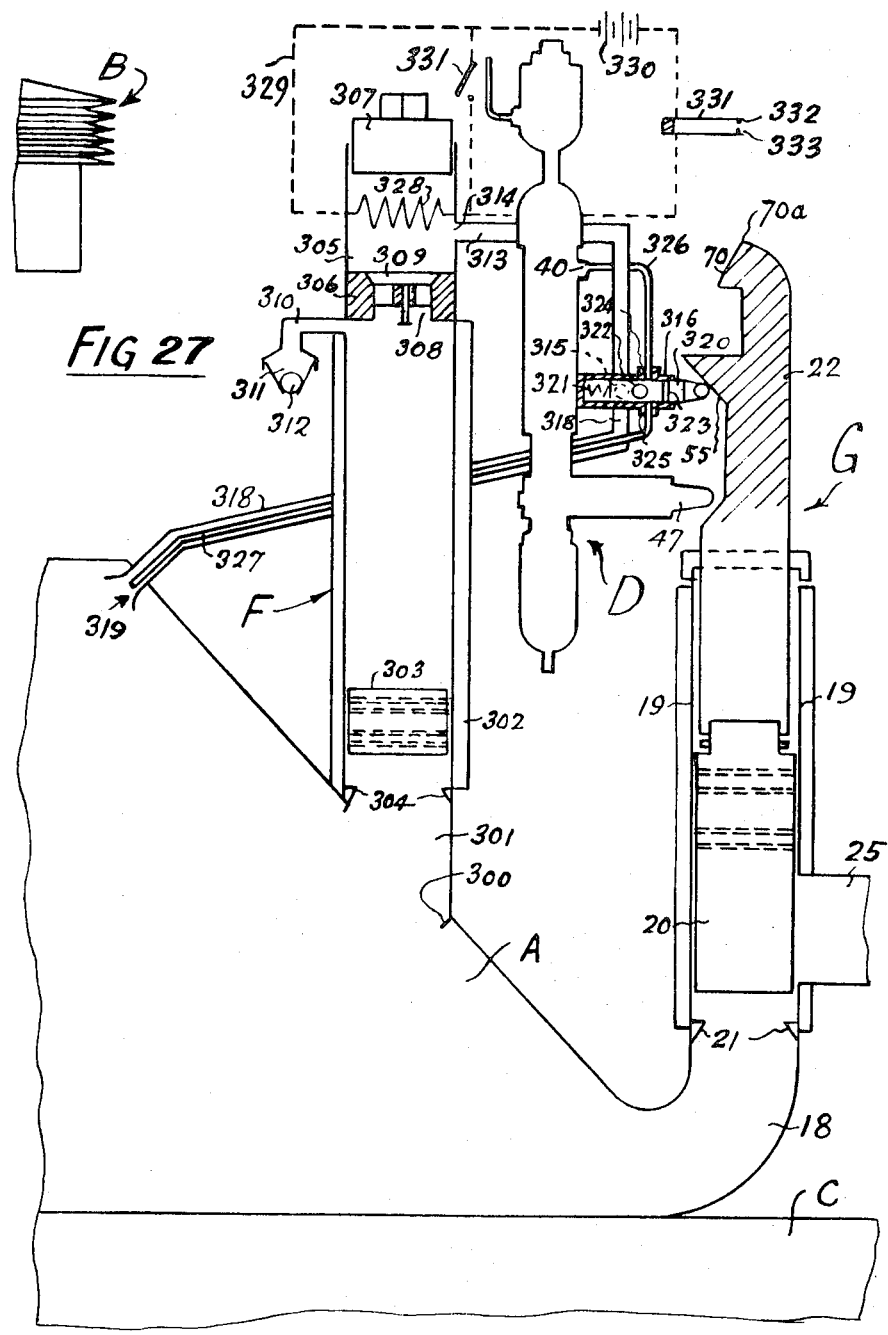
FIG. 27 is an elevational view of the gas generating unit according to modification D of the invention.

FIGS. 38 to 44 illustrate four successive phases 1, 2, 3, 4 in the operational cycle of the prime mover of FIG. 37, FIG. 38 being a section through FIG. 37 on line 2—2, FIG. 41 being a section through FIG. 40 on line 5—5 and FIG. 43 being a section through FIG. 42 on line 7—7;

FIGS. 45 and 46 are views similar respectively to FIGS. 40 and 42 illustrating an arrangement in which the water which is forced into the pipeline is taken from the water outside the craft;

FIG. 47 illustrates a detail common to both of the forms of modification E;

FIG. 48 is a diagrammatic plan view of the stern end of the watercraft;

FIGS. 49 and 50 are a plan and corresponding elevational view of a streamlined rudder for steering the craft;

FIGS. 51 and 53 are a plan and a corresponding elevational view of a deflector for steering the craft and also for reversing its direction of travel;

FIG. 52 is an elevational view of FIG. 48;

FIG. 54 is a view simlar to FIG. 48 illustrating an arrangement in which six identical gas generating units and associated accelerator mechanisms AM and pump means LIM are employed in conjunction with a single pipeline common to them all; and FIGS. 55 to 57 illustrate modification E generally similar to that illustrated in FIGS. 45 and 46, but in which ball valves are used to control the water inflow and outflow passages leading respectively to and from the interior space of the cylinder of the pump means aforesaid.

Summarizing, FIGS. 3 to 10 illustrate Modification A; FIGS. 11 to 21 illustrate Modification B; FIGS 22 to 26 illustrate Modification C; FIGS. 27 to 36 illustrate Modification D; and FIGS. 37 to 57 illustrate Modification E.

DETAILED DESCRIPTION OF EXAMPLE EMBODIMENT

In the various Figures the same reference letters and numerals are used as are used in FIGS. 1 and 2.

According to Modification A a vent passage leads out of gas duct 25 to the external atmosphere. This passage comprises a first section 100 and a second section 101. The two sections are joined by a local enlargement 102 of the passage.

Upstanding from enlargement 102 is a cylinder 103 closed at the lower end by a wall 104 and at the upper end by a threaded plug 105 screwing into the bore of cylinder 103 so as to be adjustable therealong.

Located within cylinder 103 are a pair of pistons 106, 107 working respectively in a pair of barrels 108, 109. Barrel 108 has in its wall, at the lower end of the barrel, a port 110. Barrel 109 has a similar port 111. Port 110 communicates continuously by way of a conduit 112 branching from another conduit 113 with the interior space of combustion chamber A. Port 111 also communicates continuously by way of a conduit 114 also branching from conduit 113 with said interior space.

Also housed within cylinder 103 is a seating 115 for a coil spring 116 interposed in compression between seating 115 and the roof of a recess 117 in the underside of plug 105. Spring 116 presses pistons 106, 107 in the downward direction.

Located between sections 100 and 101 of the vent passage is a valve 118. This valve is the "gas escape valve." It has a stem 119 extending freely through a bore 120 in wall 104 and also through plug 105. Seating 115 is firmly attached to stem 119 by locknuts 121, 122.

FIG. 3 shews the positions of the parts at the commencement of the combustion phase. Piston 20 is at its bottom-of-stroke position and valve 118 is in the open position.

FIG. 4 shews the positions of the parts shortly after commencement of the combustion phase. Piston 20 has commenced to rise but the gas outlet 18 is still closed by piston 20 and valve 118 is in the closed position.

FIG. 5 shews the positions of the parts upon completion of the combustion phase. Piston 20 is at its top-of-stroke position and valve 118 is still in the closed position.

FIG. 6 shews the positions the parts assume towards the end of the scavenging phase. The gas pressure in the combustion chamber has fallen to a value below the predetermined value at which valve 118 is timed to open. Piston 20 is still in its top-of-stroke position and valve 118 has commenced to open — thereby re-establishing communication between the interior of the combustion chamber and the external atmosphere via gas outlet 18, gas duct 25 and vent passage 100, 102 and 101. With said communication fully re-established (chain line position of valve 118 in FIG. 6) low pressure gas flows freely from said interior space to the external atmosphere — thus promoting ready completion of the scavenging phase.

Valve 118 is forced to the closed position by the gas pressure in the combustion chamber, said pressure being transmitted to the valve via conduits 113, 112, 114, the interior spaces below pistons 106, 107 of barrels 108, 109, pistons 106, 107, spring seating 115, locknuts 121, 122 and valve stem 119 and said pressure operating against downward thrust from spring 116 transmitted to pistons 106, 107 via seating 115, and to valve 118 via seating 115, locknuts 121, 122 and valve stem 119. The arrangement is one, therefore, in which valve 118 is spring loaded in the direction to open the valve and pneumatically loaded in the opposite direction — as hereinbefore set forth.

Referring now to FIGS. 9 and 10 the adjusting plugs of the gas escape valves of the six gas generating units are marked 125, 126, 127, 128, 129, 130. The six plugs are operatively connected through gearing to a central control shaft 131. The gearing includes in the case of each plug a bevel wheel 132 fast with the plug, a bevel pinion 133 meshing with bevel wheel 132, a transmission shaft 134 fast with bevel pinion 133 and a second bevel pinion 135 also fast with shaft 134. The gearing further includes a second bevel wheel 136 fast with shaft 131. Rotation of shaft 131 produces simultaneous and identical rotation of plugs 125–130 with consequent simultaneous and equal adjustment of the loading force of springs 116.

MODIFICATION B

The arrangement visualised in FIG. 11 is one in which six gas generating units are employed. The units are identical and each conforms to the basic form aforesaid of the parent prime mover. The figure only shews, however, the following parts of one of the units: bellows B; cam blade 22 carrying cam 70; trip finger 73; plunger 71; bore 72; tension spring 74; pipe 82; plunger 80; bore 81; compression spring 84; abutment 83.

TIMING UNIT

This unit consists of the following parts: (a) a stationary block 200 carrying in fast relation to it a spindle 201 upstanding from the block, the general plane of the block being horizontal and the axis of spindle 201 vertical; (b) six plungers 202–207 reciprocatable each in turn within six cylinders 208–213 in fixed relation to block 200 — the six plungers and their respective cylinders being disposed with their axes vertical and located at equal angular intervals around the axis of spindle 201 and also on the same pitch circle $pc$; six cam follower rollers 214–219 revolubly mounted one on each of the pistons 202–207; a power driven revolving disc 220 rotatably mounted on spindle 201, being located thereon axially of the spindle by an annular flange 221 thereon; and an arcuate cam 222 on the underside of disc 220, the centre of curvature of the cam being located on the axis of spindle 201 and the longitudinal centre line of the cam being situated at a distance from the axis of spindle 201 which is equal to the radius of pitch circle $pc$.

Each of the cylinders 208–213 has in its wall, below the associated piston (202 etc.) a port 223 and leading from each port 223 is a branch pipe 224 from pipe 82. These branch pipes and the respective cylinders 208–213 are filled with hydraulic fluid in continuity with the hydraulic fluid in pipe 82.

A further branch pipe 225 leads from pipe 82 to a pneumatic buffer. This buffer consists of a plug 226 screwed into the outer end of a barrel 227 containing a pocket of air 228 between plug 226 and the hydraulic fluid 229 filling pipe 82 and branch pipe 225. Plug 226 is adjustable along the bore of barrel 227 to vary as required the effective buffering action of air pocket 228.

At the top of the cylinder 231 in which plunger 80 works and in fast relation thereto is a collar 232 effective to limit the travel T of plunger 80, the dimensions of the parts being such that the face area of plunger 80 is the same as that of plunger 71 and the distance of operative travel of plunger 80 is also the same as that of plunger 71. In addition the face area of each of plungers 202–207 is twice that of plungers 80 and 71 and the travel of plungers 202–207 and therefore the height of cam 222 is one-half the travel of plungers 80 and 71.

Plungers 202–207 are guided in their operational movement by a rod 233 of oblong cross-section extending through an aperture 234 of like section at the centre of a spider 235 extending across the bore of the cylinder (as 208) in which the plunger (as 202) works.

In the layout of FIG. 21 the timing unit is marked TU. Fragmentary representations of the six bellows of respectively the six gas generating units are shewn at B$a$–B$f$. The trip finger plungers 73 of the respective gas generating units are shewn at TFP$a$–TFP$f$. The cam blades 22 of the respective gas generating units are shewn at BL$a$–BL$f$. The six pipes 82 of the respective gas generating units are shewn at PL$a$–PL$f$. The six branch pipes leading from the pipes 82 to the timing unit TU are shewn at 224$a$–224$f$. The six abutments 83 of the respective gas generating units are marked A$a$–A$f$.

In FIGS. 16–20 the same reference characters are used as are used in FIG. 11 and it is thought that the FIGS. will be self-descriptive of the various phases $a$, $b$, $c$, $d$ and $e$ depicted therein — save to add that the Figures illustrate the positions occupied in the successive phases $a$–$e$ by the component movable parts (plunger 80, trip finger 73, cam blade 22 and bellows B) of one and the same gas generating unit, which parts, as will be seen, are cross-hatched, and that the timing unit plunger (say plunger 205) and its associated cam follower roller (217) that are cross-hatched in these Figures are the same plunger and cam follower roller in all of the Figures.

MODIFICATION C

The arrangement illustrated in FIGS. C1 and C2 is similar to that illustrated in FIGS. 15 and 16 of Pat. No. 1,232,171.

Thus pipeline C is branched at two positions, one AA located behind jet nozzles 27 and one BB in front thereof. The two branches $b1$ and $b2$ in rear of location AA lead thereto from the two sides of the craft. The two $c1$, $c2$ in front of location BB lead aft, terminating at equal distances from the longitudinal centre-line CL of the craft.

At location BB is a deflection DF angularly movable about a vertical axis AX between two limit positions $p1$, $p2$. When deflector DF is in the central (full line) position flow of water along the pipeline is equally distributed between branches $c1$ and $c2$ — with the result that the craft is propelled along a straight forward course. When deflector DF is in position $p1$ water flow is diverted entirely into branch $c2$. When deflector DF is in position $p2$ water flow is diverted entirely into branch $c1$. At settings of the deflector between positions $p1$ and $p2$ water flow is partly along branch $c1$ and partly along branch $c2$, the respective proportions of the two parts of the flow and the allocation of the branches along which respectively the major and minor parts of the flow being determined by the angular setting of the deflector. By appropriate selection of the setting of the deflector the craft may be steered either forwardly, or to port or to starboard.

The gas generating unit is generally marked P. Its combustion chamber is marked A; the bellows of the unit is marked B; the gas outlet of the combustion chamber is marked 18; the gas duct is marked 25; the nozzle ring is marked 26; and the nozzles which deliver the combustion gases into the pipeline are marked 27.

According to Modification C gas duct 25 has in its wall a tall U-bend UB which extends upwardly to a height well above the level of the plimsoll line PL of the craft.

In U-bend UB, near to the top thereof and in the limb of the bend remote from gas outlet 18, is a local enlargement 240.

Housed in enlargement 240 is a gravity loaded valve 241. This valve is normally open (full line position in FIG. 26) and it automatically closes (to the chain position) whenever a surge of water should occur in U-bend UB threatening to invade combustion chamber A.

Valve 241 is moved to the closed (chain line) position by upward thrust from a buoyancy float 242 rigidly attached to the valve by a stem 243. The unit comprising valve 241, float 242 and stem 243 is guided for upward and downward movement by guides 244, 244a extending across the interior space of enlargement 240.

Valve 241, when in the closed (raised) position, engages an annular seating 245 located at the bottom of a cylindrical conduit 246 extending coaxially with enlargement 240 from seating 245 to a gutter 247 extending around the wall of enlargement 240 on the inner side thereof and sloping downwardly (FIG. 26) towards an outflow conduit 248 leading to a sump 249 fitted with a level gauge 250.

In the bottom wall of sump 249 is an outlet port 251 communicating with the bore of a cylinder 252 in which is a plunger 253 fast with a rod 254 extending through a stuffing gland 255 and spring-urged to the full-line position (FIG. 26) by a compression spring. In this position, which is the normal position of the plunger, the latter closes port 251 and when the plunger is moved to the left (in FIG. 26), by thrust from a hand lever 257 pivoted at 258 and abutting the outer end of rod 254, it opens port 251 and also a port 259 opposite thereto in the wall of cylinder 252, so as to permit outflow of water from sump 249 to a drain pipe 260.

Referring now to FIG. 23, the arrangement shewn is similar in all respects to that shewn in FIG. 17 of the drawings of United Kingdom Pat. No. 1,232,171 — save for structure embodying the present invention, as regards Modification C.

Thus there are six identical gas generating units marked respectively G1–G6 and six associated nozzle rings j1–j6, the six nozzle rings being connected respectively with the gas outlets of the six gas generating units by six gas ducts — all as in the arrangement shewn in said FIG. 17. Also, again as in the arrangement shewn in said FIG. 17, the pipeline of the prime mover is branched at position BB, the two branches being marked c1 and c2.

According to Modification C each of the six gas ducts 25 has in it a U-bend UB controlled by a water trap valve arranged and operable as set forth above with reference to FIG. 26.

FIG. 24 illustrates a constructional detail according to which the pipeline, along the section thereof where the nozzle rings are located, is reinforced by a cylindrical reinforcement CR. The same Figure illustrates a further constructional detail according to which the pipeline is rigidly connected to the frame of the watercraft (marked FM) by brackets DM which transmit the reaction of the jet nozzles, through the wall of the pipeline, to said frame.

MODIFICATION D

FIGS. 27–31 shew the following components of the gas generating unit: (1) the combustion chamber A; (2) the fuel feed control mechanism G; (3) the fuel feed unit D; (4) the air storage bellows B; (5) the fuel-hot air injection nozzle; (6) the fuel-hot air injection valve; (7) the air preheating chamber; (8) the means for inspiring a measured quantity of air from the external atmosphere and then forcing the inspired air into the air preheating chamber once per working cycle of the gas generating unit; and (9) the means for heating the air so forced into the preheating chamber, said heating means operating synchronously with component 8.

Components 5 to 9 below to Modification D. As far as the remaining components 1, 2, 3 and 4 are concerned the gas generating unit shewn in FIGS. 27–31 conforms completely in design and manner of operation to the gas generating unit of the basic form of the prime mover of United Kingdom Pat. No. 1,232,171.

According to Modification D combustion chamber A has in its wall at a position therealong inset from gas exit passage 18 a port 300. Upstanding from this port is a cylinder 301 having a heat insulating jacket 302. Reciprocatable within cylinder 301 with a fluid tight fit therewith is a gravity loaded piston 303. This piston is forced upwardly by a build-up of gas pressure in the combustion chamber consequent upon ignition of the fuel-air mixture which is injected thereinto by fuel feed unit D, and descends as permitted to do so under gravity forces acting upon it, by a fall in said gas pressure. Said fall continues until the gas pressure in the chamber reaches a value at or near atmospheric pressure, when the piston is again on its seating 304.

Surmounting cylinder 301 is a cylindrical chamber 305 the interior space of which is separated from the bore of cylinder 301 by a partition 306. Chamber 305 is closed at the upper end by a plug 307 having screw-threaded engagement with a female thread on the wall of chamber 305 so as to be adjustable therealong. In partition 306 is a port 308 controlled by a gravity loaded valve 309.

The interior space of cylinder 301 is in continuous open communication by way of an air duct 310 with an air inlet 311 controlled by a gravity loaded ball valve 312. The arrangement is such that as piston 303 moves upwardly in cylinder 301 it does so against valve 312 with the result that valve 309 opens to relieve the pressure build-up in the part of the interior space of cylinder 301 above piston 303 — so permitting air in said part to become transferred therefrom to the interior space of chamber 305.

Chamber 305 is in continuous open communication with an air duct 313 leading from a port 314 in the wall of the chamber to a port 315 in the wall of a cylinder 316 forming part of the fuel-hot air injection valve.

Diametrically opposite port 315 is a second port 317 in the wall of cylinder 316. This port is in continuous open communication by way of an air duct 318 with a nozzle 319 located within combustion chamber A. This nozzle takes the place of nozzle E of the gas generating unit illustrated in FIGS. 1 and 2.

Reciprocatable along the bore of cylinder 316 is a plunger 320 spring urged to the right (in FIG. 27) by a compression spring 321.

In plunger 320 are two ports 322 and 323. Port 322 registers with ports 315 and 317 in the wall of cylinder 316 when plunger 320 is in its leftward (in FIG. 27) limit position, having been brought to this position by thrust from cam 55 on cam blade 22. Port 323 registers with two further ports 324 and 325 in the wall of cylinder 316 when plunger 320 is in said leftward limit position. Port 324 is in continuous open communication with port 40 of fuel feed unit D by way of a pipe 326. Port 325 is in continuous open communication with nozzle 319 by way of a pipe 327. Pipes 326 and 327 correspond respectively with pipes 65 and 66 of the gas generating unit of FIGS. 1 and 2.

Within chamber 305 is an electric heating unit 328 including a current supply circuit therefore 329 that includes a battery 330 and a switch 331. The contacts 332, 333 of this switch are normally in the circuit-open position (FIG. 27) and are periodically closed, once per working cycle of the gas generating unit, by point 70a of cam 70 on cam blade 22, closure of the contacts occurring when cam blade 22 reaches its uppermost position at the end of the working stroke of piston 20.

Cylinder 316 and plunger 320 form parts of the fuel-hot air injection valve; nozzle 319 constitutes the fuel-hot air injection nozzle; chamber 305 constitutes the air preheating chamber; cylinder 301, piston 303, air valve 311 constitute with valve 309 component 8 aforesaid; and heating coil 328 and its current supply means constitute component 9 aforesaid.

The system operates as follows:

For convenience the unit comprising cylinder 301, piston 303, chamber 305, air inlet 311, valve 312, valve 309 and heating coil 328 will be called the "preheated-air feed unit". This unit is generally marked F in FIGS. 27–31.

FIG. 27 shews the positions of the parts at the commencement of the build-up of pressure aforesaid in combustion chamber A. Piston 20 has lifted off its seating 21; piston 303 has also lifted its seating 304; plunger 320 is still in its valve-closed (rightward limit) position; valve 309 is still in its closed position; ball valve 312 is also still in its closed position; and switch 321 is still in the circuit-open condition.

Figure 28:
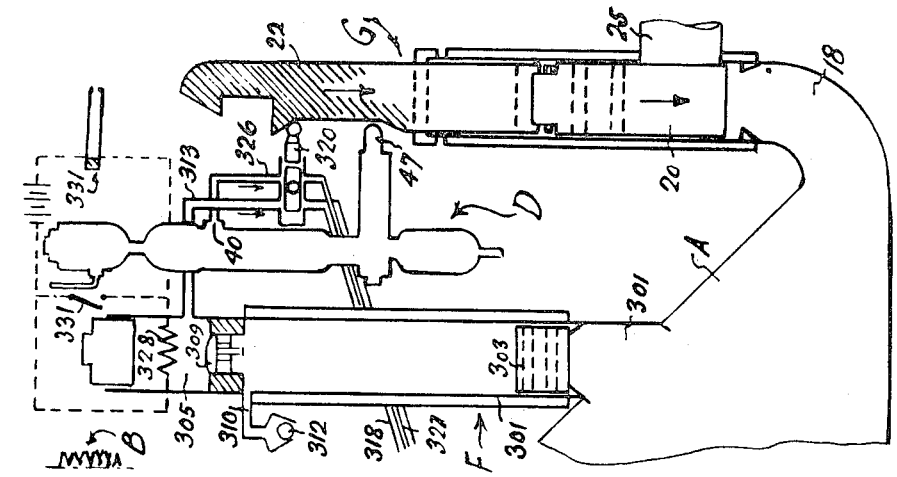

In FIG. 28 piston 20 has lifted further; plunger 47 has been engaged by cam 56; piston 303 has also lifted further; valve 309 has been forced to the open position by air pressure in cylinder 301, operating against valve 312, valve 312 being still in the closed position, and against plunger 320, plunger 320 being also still in the closed position; and switch 331 is still in the circuit-open condition.

Figure 29:
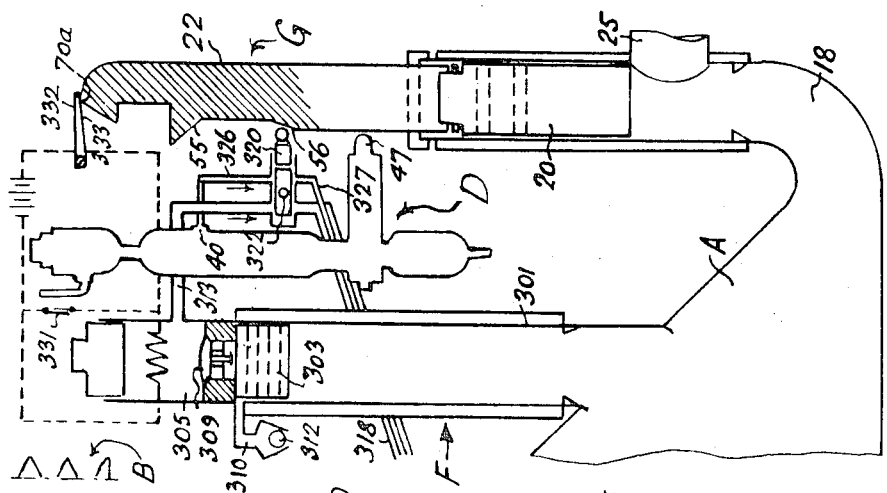

In FIG. 29, piston 20 is at its uppermost position; piston 303 is also at its uppermost position, all of the air which had been inspired into cylinder 301 during the previous downward stroke of piston 303 having been compressed into chamber 305 against plunger 320; valve 309 is closed; and point 70a of cam 70 has closed switch contacts 332, 333. The air in chamber 305 is, therefore, being heated by heating coil 328 in readiness for discharge in highly heated compressed condition, from chamber 305 to nozzle 319 by way of air duct 313, port 322 in plunger 320 and air duct 318.

Figure 30:
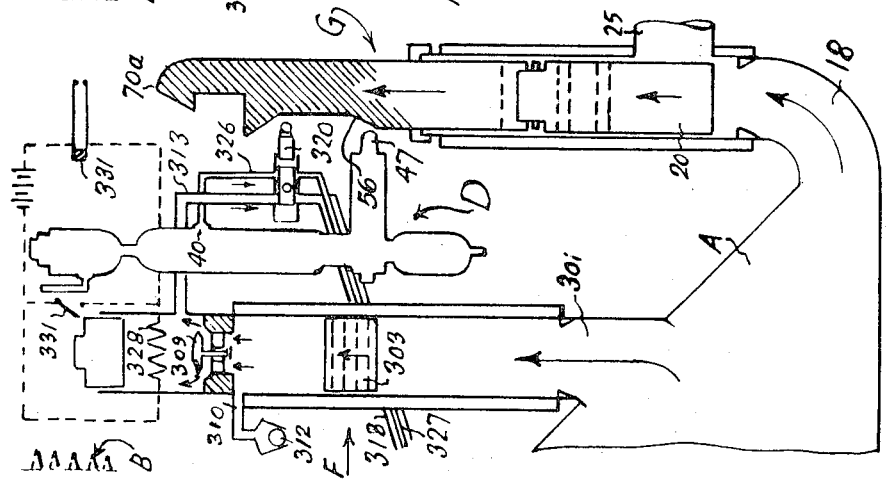

In FIG. 30, piston 20 has descended to a position near seating 21; piston 303 has descended on to its seating 304; valve 309 is still closed; and plunger 320 is about to be moved to its valve-open position by cam 55.

In FIG. 31, piston 20 is on its seating 21; piston 303 also is still on its seating 304; valve 309 is still closed; and plunger 320 has been moved to the valve-open position by cam 55 — so completing the communication between chamber 305 and nozzle 319 and simultaneously between port 40 and nozzle 319. An intimate mixture of fuel under pressure and highly heated air also under pressure is, therefore, being injected into combustion chamber A. At this stage in the working cycle of the gas generating unit scavenging of the combustion chamber has been completed and the gas pressure in the chamber is at or near atmospheric pressure.

Fuel and preheated air having been injected into the combustion chamber ignition of the combustible mixture composed in part of the injected mixture of fuel and preheated air and in part of residual air in the chamber (from bellows B) immediately takes place and the working cycle of the gas generating unit commences.

Referring now to FIGS. 32 and 33 it is thought that these Figures need no particular description in view of the full and detailed description of FIGS. 27–31 and the manner of operation of the valve as shewn in those FIGS. (32 and 33).

FIGS. 34 to 36 shew a possible refinement of the valve of FIGS. 32 and 33, according to which the two limit positions of plunger 320 are determined by two pairs of stops 340, 341 and 342, 343 in cylinder 316 operating in conjunction with two lugs 344, 345 on the extremities of two tongues 346, 347 on plunger 320 in rear of roller r. Stops 340, 341 cooperate with lugs 344, 345 to determine the leftward (in FIGS. 32 34 and 35) limit position of the plunger, i.e., the position thereof in which air port 322 is in register with air ports 315, 317 and fuel port 323 is in register with fuel ports 324, 325, and stops 342, 342 co-operate with lugs 344, 345 to determine the rightward position of the plunger, i.e. the position thereof in which the two air ports 315, 317 and the two fuel ports 324, 325 are blinded by the plunger, the valve now being in the closed condition.

MODIFICATION E

FIGS. 37 to 46, 48 to 54 and similarly FIGS. 55 to 57 shew the pipeline C, the nozzle ring 26, the gas outlet 18, the shutter piston 20 and the gas duct 25 (all as aforesaid) of the prime mover. The waterline of the craft is marked WL adjacent several of the Figures.

The spent-gas outlet passage leading from gas duct 25 to the gas inlet of accelerator mechanism AM is marked 100. The gas passage leading from the combustion chamber (not shewn) to the space below piston 106, 107 of accelerator mechanism AM is marked 113. The spent-gas outlet of the accelerator mechanism, leading to the external atmosphere, is marked 101.

Referring to the form of Modification E illustrated in FIGS. 37 to 44, 48 to 53 the pump means LIM comprises a vertically disposed cylinder 400 communicating with nozzle ring 26 via a liquid inflow/outflow passage 401 leading from the interior space of the cylinder and with gas duct 25 via a gas inflow/outflow passage 402 leading from said interior space. The pump means further comprises a piston 403 reciprocatable within cylinder 400 with a fluid-tight fit with the wall thereof. Piston 403 is hollow and lighter than water. It therefore floats on the water (marked *w*) occupying the interior space of cylinder 400. This water has flowed under the head pressure of the water (marked *ww*) filling pipeline C, into the cylinder.

Piston 403 has an overall specific gravity of (say) 0.7. It floats in water submerged to approximately three-fourths of its height. Cylinder 400 is of large volume. Assuming its internal diameter and therefore the external diameter of piston 403 is D and the maximum travel of piston 403 is H, the volume H × ¼π D$^2$ is the amount of water which will be expelled from the cylinder into the pipeline via nozzle ring 26 when the gas generating unit is delivering the maximum amount of high pressure gas. When the gas delivery is less than this amount the downward travel of piston 403 will be less than H. When the power drive in the system is finished and accelerator mechanism AM commences to exhaust spent gas to atmosphere the water pressure in the pipeline (due to the head of water outside the craft) causes piston 403 to rise by reason of inflow of water into cylinder 400 from the pipeline via nozzle ring 26. This continues until the water in cylinder 400 balances the head of water outside the craft. The process commences as soon as accelerator mechanism AM begins to exhaust low pressure gas to atmosphere and continues whilst the combustion chamber is being scavenged and then on until, early in the next working cycle of the gas generating unit, piston 20 starts to rise and opens gas outlet 18.

The various phases 1, 2, 3, 4 of the operational cycle of the prime mover will now be described.

PHASE 1

This phase is shewn in FIG. 39. Combustion is commencing. Gas outlet 18 is closed. Piston 403 is at the top of cylinder 400. So far there is no injection of water from cylinder 400 into nozzle ring 26 and thence into pipeline C. Hence the power drive in the system, resulting in the issuance of high pressure jets of water out of pipeline C into the water outside the craft, has not yet commenced.

PHASE 2

This phase is shewn in FIGS. 40 and 41. Combustion is complete. Piston 20 is at the top of its working stroke. Piston 403 is descending under the thrust of combustion gases reaching it via gas outlet 18 and gas duct 25. Water *w* is being injected by piston 403 into nozzle ring 26 and thence into pipeline C, producing high velocity flow of the water *ww* along the pipeline. The power drive is now proceeding.

PHASE 3

This phase is shewn in FIGS. 42 and 43. The power drive has ceased. Low pressure (spent) gas is exhausting to atmosphere through accelerator mechanism AM, with the result that the gas pressure on piston 403 is at or near zero. Water from pipeline C is flowing into cylinder 400 via nozzle ring 26 with consequent upward travel of piston 403 towards and eventually to its top-of-cylinder position.

PHASE 4

This phase is shown in FIG. E8. Piston 403 is at its top-of-cylinder position. The gas pressure in the combustion chamber and therefore in gas duct 25 is practically zero and piston 20 is commencing to descend to its bottom-of-stroke position, in which position it appears in FIGS. 37 and 38 and also in FIG. 39. The combustion cycle (working cycle of the gas generating unit) is now about to re-commence.

In FIGS. 48 and 52 the hull of the craft is shewn at 410; the gas generating units are marked GGU; the pipeline is marked C and the nozzle ring 26. Pipeline C is branched both in rear of nozzle ring 26 and forward thereof. Branches 411, 412 in rear of the nozzle ring are inflow branches. Branches 413, 414 forward of the nozzle ring are outflow branches. Branches 411, 412 have cowled inlets 415, 416. Branches 412, 414 house the rudders aforesaid. These are marked 417 in FIGS. 48, 49 and 50. Alternatively, they may house the steering/reversing deflectors aforesaid. These are marked 418 in FIGS. 51 and 53.

FIG. 54 shews the hull of the craft, marked 420, the six gas generating units GGU, the six gas ducts 25 and the six nozzle rings 26. This Figure also shews the pipeline C, branched both rearwardly and forwardly of the nozzle rings 26, as in the arrangement illustrated in FIGS. 48 and 52 E9 and E10.

FIGS. 45 and 46, which correspond respectively, as regards illustration of the successive phases aforesaid of the operational cycle of the prime mover, to FIGS. 40 and 41 and FIGS. 42 and 43, shew a construction in which the water taken into cylinder 400 flows thereinto from the water outside the craft by way of an inflow passage 421 controlled by a check valve 422 opening under the head pressure of the water in passage 421 at the level at which valve 422 is located below the waterline WL of the craft, in the direction towards the interior of cylinder 400; and in which the water injected into the pipeline via the nozzle ring is forced out of cylinder 400 (by the gas pressure acting upon piston 403) by way of an outlet passage 423 controlled by a spring loaded valve 424 opening in the direction towards the nozzle ring under the pressure of high pressure gas acting on piston 403, said pressure being transmitted to valve 424 through the intermediary of the water *w* in cylinder 400. FIG. 45 shews piston 402 being forced downwardly by the high pressure gas reaching it via gas duct 25, and valve 424 in the open position. Water is now being injected into pipeline C via nozzle ring 26. FIG. 46 shews piston 403 moving upwardly under the pressure of water flowing into cylinder 400 from outside the craft via inflow passage 421, check valve 422 being now in the open position and valve 424 in the closed position.

Referring now to FIGS. 55 to 57, the ball valves hereinbefore mentioned are marked *v*1 and *v*2. Valve *v*1 controls outflow passage 401 of cylinder 400. Valve *v*2 controls inflow passage 421 of cylinder 400.

Valve *v*1 seats when in the closed position (FIGS. 55 and 57) on a frusto-spherical seating *s*1 defining the throat of a streamlined restricted passageway *s*2 located near the lower end of the interior space of cylinder 400, immediately below the lowermost position reached by piston 403 in the operation of the pump means. The valve is a buoyancy loaded valve, being suitably lighter than water so as to be capable of assuming the closed position automatically by reason of its buoyancy as soon as the power drive ceases and of staying in this position until the commencement of the next following power drive. Depending from valve seating $s1$ is an inverted cage $s3$ which locates valve $v1$ when the latter is in the open position (FIG. 56).

Valve $v2$ seats when in the closed position (FIG. 55) on a frusto-spherical seating $s4$ defining the throat of a streamlined restricted passageway $s5$ dividing inflow passage 421 into an outer portion 421a remote from the interior space of cylinder 400 and an inner portion 421b adjacent thereto. The valve is a gravity loaded valve, being suitably heavier than water so as to be capable of assuming the closed position (FIGS. 55 and 56) automatically by reason of gravitational force acting upon it as soon as the powwer drive ceases and of thereafter remaining in this position until such time as the head pressure of the water outside the craft, at the level of the valve, commences to exceed the water pressure acting on the valve under the gas pressure obtaining in gas duct 25, said gas pressure being transmitted to the valve through the intermediary of piston 403 and the body of water $w$ occupying the portion of the interior space of cylinder 400 beneath the piston. Superposed above seating $s4$ is a cage $s6$ effective to locate valve $v2$ when the latter is in the open position (FIG. 57).

FIG. E18 shews the position of the parts just prior to commencement of a power drive. Valves $v1$ and $v2$ are both in the closed position and piston 403 is at its uppermost position in cylinder 400.

FIG. 56 shews the position of the parts when the power drive is in operation. High pressure gas is forcing piston 403 downwardly and water $w$ in cylinder 400 is being ejected past valve $v1$ (now in the open position) into pipeline C, valve $v2$ being still in the closed position and being held there by the pressure of the gas acting upon piston 403.

FIG. 57 shews the position of the parts when the power drive has finished. Low-pressure gas is being exhausted to atmosphere via accelerator mechanism AM. PIston 403 is rising, being forced upwardly by the pressure of water flowing into cylinder 400 from outside the craft via inflow passage 421, past valve $v2$.

An important advantage of an arrangement as illustrated in FIGS. 18 to 20, as compared with an arrangement as illustrated in FIGS. 37 to 44, 48 to 53, is that it avoids turbulence in the pipeline when floating piston 403 is rising and water would, with an arrangement as illustrated in FIGS. 37 to 44, 48 to 53, be flowing back through nozzles 27 of the jet means.

It may also be remarked that by using ball valves, as in the arrangement illustrated in FIGS. 55 to 57, particularly when these are used with streamlining of the port passages controlled by the valves, minimisation of interference with stream-line flow of the liquid past the valves is readily ensured.

FIG. 47 illustrates an arrangement in which to allow any water that may have leaked past piston 403 to flow back into the pipeline, a drain passage 425 is provided leading downwardly through the piston from a shallow sump 426 in the crown of the piston.

It is to be understood that the precise constructional form of the invention as regards any of the Modifications A, B, C, D and E may vary widely, provided the general principles of the invention according to the respective modifications are retained.

For example, as to Modification A, the form of the vent passage leading to atmosphere from the gas duct and of the gas escape valve located within this passage may vary widely. Similarly, as regards Modification B, the precise form of the timing unit may vary, provided the general principle and functional characteristics of the unit are embodied. Likewise, in Modification C the precise form and location of the U-bend in the gas duct, and of the water trap valve therein, may be different from that shewn in the drawings, provided again the general principle and functional characteristics of these parts are embodied. In the case of Modification D the precise constructional form of the aforesaid components 5, 6, 7, 8 and 9 of the gas generating unit according to this Modification may vary widely. For example, the precise location of cylinder 301 of the preheated-air feed unit F, the location and form of the preheating chamber 305 of said unit F, the form of the means employed to heat the compressed air in chamber 305, and the precise form of the fuel-hot air injection valve may all be varied — provided the general principle of the invention according to Modification D be retained. Finally in the case of Modification E, the precise form and constructional details of the pump means LIM may vary within wide limits provided the general principle of the invention according to the modification is retained.

It remains to remark that any one of the five Modifications A, B, C, D, E may be used in combination with any one or more of the others.

What is claimed is:

1. A prime mover comprising a gas generating unit including a combustion chamber having a gas outlet, a gas duct connected to said gas outlet, a first automatic mechanism for pumping a measured quantity of air into the combustion chamber once per working cycle of the unit, a second automatic mechanism for pumping a measured quantity of liquid fuel into the combustion chamber once per working cycle of the unit, an automatic shutter mechanism for momentarily blocking the passage of gas from the gas outlet to the gas duct at the end of each working cycle, and an interlinking mechanism for sequentially operating the first and second automatic mechanisms and the automatic shutter mechanism; and a liquid filled pipeline into which combustion gases of the unit are discharge by jet means by way of said gas duct; said prime mover further comprising means for venting the combustion chamber of the gas generating unit once per working cycle of the unit whenever during said working cycle the gas pressure in the combustion chamber falls to a value below a predetermined value, said venting means comprising valve means connected to said gas duct for automatically venting said gas duct in response to gas pressure changes in the combustion chamber.

2. A prime mover according to claim 1, wherein said venting means includes a vent passage leading to atmosphere and a gas escape valve in controlling relation to said vent passage, said valve being spring loaded in the direction to open the passage and pneumatically loaded in the opposite direction by pressure responsive means continuously loaded by the gas pressure obtaining in the combustion chamber.

3. A prime mover according to claim 2 wherein the tension of the loading spring of said valve is adjustable to vary the magnitude of said predetermined value of the gas pressure in the combustion chamber.

4. The prime mover of claim 1, wherein said unit comprises plural gas generating mechanism, each gas generating mechanism of the unit includes cam means on a cam carrier fast with the automatic shutter mechanism, said cam carrier being reciprocatable between a first position in which the shutter is in the closed position thereof and a second position in which the shutter is in the open position; detent means for holding the cam carrier in the first position until the time in the working cycle of the unit that the gas outlet of the combustion chamber is due to close, and a hydraulic linkage between the detent means and the first automatic mechanism, such that the detent means is automatically operated to the ineffective condition under the control of said first mechanism exercised through the hydraulic linkage, characterized in that, in the case of each gas generating unit mechanism, a pipe filled with hydraulic fluid and constituting part of the hydraulic linkage aforesaid includes a branch stemming therefrom and terminated by a piston working in a cylinder forming with the piston a timing unit for the gas generating unit mechanisms, said timing unit being operative to bring the hydraulic linkages of the respective gas generating units into function in predetermined sequence and at predetermined time intervals, the arrangement being one in which in the case of each gas generating unit mechanism a reciprocatable member forming part of said first mechanism functions during the pumping phase of that mechanism to force the branch piston to a position in its cylinder in which it lies in the path of a cam on a power driven cam carrier also forming part of the timing unit, said cam carrier being driven at a predetermined speed and its location being such that as it performs its operative movement it brings the cam into register with the branch pistons in predetermined sequence, forcing them back in said sequence to initial position in the relative cylinder against the resistance of said reciprocatable member and producing in consequence the required operation of the detent means of said interlinking mechanism in the direction of release the shutter for return to its closed position.

5. A prime mover according to claim 4, wherein the operative movement of said cam carrier is rotational about a fixed axis, the branch pistons being positioned around said fixed axis with their respective axes located on a pitch circle concentric therewith, and said cam is arcuate in a plane normal to said fixed axis with its axis of curvature in said plane coincident therewith.

6. A prime mover according to claim 4, comprising driving means for said cam carrier, said driving means having an operational speed that is variable at will to vary as required the time interval between successive thrust pulses in the pipeline and in consequence the total power developed in the prime mover.

7. A prime mover according to claim 4, comprising a pneumatic buffer, said hydraulic linkage being positioned to operate against said pneumatic buffer.

8. A prime mover of claim 1 comprising a water trap interposed in the path of the combustion gases along the gas duct.

9. A prime mover according to claim 8, wherein the gas duct includes an inverted U-shaped bend therein which extends upwardly to a given level, a gravity loaded valve in said bend at a location therein which will always be above said level, a buoyancy chamber in said bend below said valve in said bend, said gravity loaded valve being normally open but adapted to automatically close under thrust from said buoyancy chamber, said buoyancy chamber being connected to the valve so as to be movable in unison therewith as the valve closes and opens and the buoyancy chamber being adapted to close the valve whenever a surge of liquid from the pipeline should occur in the bend threatening to invade the combustion chamber.

10. A prime mover according to claim 9, wherein said bend has a local enlargement, the valve and buoyancy chamber being located with said local enlargement in the bend, a short duct located within said enlargement at a position therein above the valve, and forming a valve seat for said gravity loaded valve in the closed position a catchment surrounding the mouth of the duct so as to catch any liquid that may get past the valve and thence past the mouth of the duct, the upper end of said short duct projecting into said catchment, said catchment having an outlet in the wall thereof, and a sump connected to the catchment outlet and having an outlet controllable at will by a valve.

11. A prime mover of claim 1 further comprising means for injecting a measured quantity of highly heated compressed air into the combustion chamber in intimate admixture with the fuel to be burnt therein.

12. A prime mover according to claim 11, wherein said means includes a preheating chamber; a first means for compressing into said chamber during each fuel-air combusting phase of the working cycle of the gas generating unit a measured quantity of air drawn from the external atmosphere; a second means for heating said air in the preheating chamber to a predetermined elevated temperature while it is in the compressed state; and a third means operating in time with said second automatic mechanism of the gas generating unit for releasing the preheated air from the preheating chamber and delivering it in intimate admixture with the fuel flowing from said second automatic mechanism into the combustion chamber.

13. A prime mover according to claim 12, wherein said first means consists of a piston pump having a pump barrel and a piston reciprocatable therein with a suction stroke and a compression stroke, an air inlet port communicating with the external atmosphere and controlled by an inwardly opening non-return valve, with respect to the bore of the pump barrel, an air outlet port communicating with the preheating chamber and controlled by an outwardly opening non-return valve with respect to said bore, the arrangement being one wherein the compression strokes of the piston are performed during and in consequence of the build-up of pressure which occurs in the combustion chamber as the combusting phase of the working cycle of the gas generating unit proceeds, the portion of said bore in rear of said piston as the latter performs its compression stroke is in continuous communication with the interior space of the combustion chamber, and the suction strokes of the piston are performed in consequence of a yielding control force continuously acting upon the piston.

14. A prime mover according to claim 13, wherein said yielding control force is the force of gravity.

15. A prime mover according to claim 12, wherein said second means consists of an electric heating element located within the preheating chamber and energised by a current source included in an electrical circuit controlled automatically by a switch which is operated to close the circuit by means of a reciprocatable member forming part of the fuel pumping mechanism, said member being reciprocatable once per working cycle of the gas generating unit and the arrangement being one in which the switch closes under the control of the reciprocatable member immediately following compression of the air into the preheating chamber and opens under said control prior to release of the air from the preheating chamber.

16. A prime mover according to claim 12, wherein said third means includes a combined air-fuel injection valve consisting of a plunger reciprocatable within a cylinder between (1) a valve-open position in which (a) an air port passage extending through the plunger is in register with two air ports in the wall of the cylinder in continuously open communication one with the preheating chamber and the other with the air-discharge orifice of a combined air-fuel injection nozzle located within the combustion chamber, and (b) a fuel port passage extending through the plunger is in register with two fuel ports in said wall in continuously open communication one with the fuel inlet of the fuel pumping mechanism and the other with the fuel discharge orifice of the injection nozzle, and (2) a valve-closed position in which the plunger blinds all of said ports in the cylinder wall, the said plunger being spring urged in the direction towards the valve-closed position and the arrangement being one in which when the plunger is in the valve-closed position a part movable with the plunger and located exteriorly of the cylinder is positioned in the path of a member forming part of the fuel pumping mechanism, said member being reciprocatable once per working cycle of the gas generating unit, and further one in which the plunger is moved to the valve-open position by said member immediately prior to the fuel-air combusting phase of said working cycle.

* * * * *